United States Patent [19]

Lerner

[11] Patent Number: 5,526,257
[45] Date of Patent: Jun. 11, 1996

[54] PRODUCT EVALUATION SYSTEM

[75] Inventor: Sam Lerner, New York, N.Y.

[73] Assignee: Finlay Fine Jewelry Corporation, New York, N.Y.

[21] Appl. No.: 331,467

[22] Filed: Oct. 31, 1994

[51] Int. Cl.⁶ ........................................... G06F 15/21
[52] U.S. Cl. ....................................................... 364/401
[58] Field of Search .................................. 364/401, 402, 364/403, 406, 404

[56] References Cited

U.S. PATENT DOCUMENTS

| | | |
|---|---|---|
| 4,887,207 | 12/1989 | Natarajan . |
| 4,887,208 | 12/1989 | Schneider et al. . |
| 5,053,956 | 10/1991 | Donald et al. .......................... 364/401 |
| 5,216,594 | 6/1993 | White et al. . |
| 5,237,496 | 8/1993 | Kagami et al. . |
| 5,237,498 | 8/1993 | Tenma et al. ............................ 364/406 |
| 5,255,349 | 10/1993 | Thakoor et al. . |
| 5,299,115 | 3/1994 | Filds et al. . |
| 5,321,625 | 6/1994 | Humm et al. . |
| 5,337,253 | 8/1994 | Berkovsky et al. . |
| 5,377,095 | 12/1994 | Maeda et al. ........................... 364/401 |

OTHER PUBLICATIONS

Stern, Aimee L.; Business Month vol. 134, No. 1 p. 60 "In Search of Micro Niches"; Jul. 1989.

Mainframe Computing; "IBM Information Warehouse Framework Applied on VAX/VMS Platform"; May 1992 vol. 5 No. 5.

Schell, Ernest; Direct vol. 4 No. 1 p. 26; "Getting to the data (Computer Services Special Report)"; Jan. 1992.

Bittel, Lester; Ronald Burke, Lawrence LaForge; Business in Action; 1984 pp. 26–27; 44.

Schwartz, David, Marketing Today A Basic Approach; 1981, pp. 208–210.

*Primary Examiner*—Gail O. Hayes
*Assistant Examiner*—Charles R. Kyle
*Attorney, Agent, or Firm*—Lowe, Price, Leblanc & Becker

[57] ABSTRACT

A computer implemented product evaluation system includes a data base storing evaluation data of products, and a data processor responsively connected to the data base, receiving a request to evaluate the success and lack thereof of one of the products, evaluating the success and lack thereof of the one of the products, and generating an evaluation result. The evaluation result indicates the success and lack thereof of the product with respect to at least one of the following: category, and class of the product, and group and branch selling locations and vendor. Further, a display device is provided which is connected to the data processor, receiving the evaluation result from the data processor, and displaying the evaluation result for the one of the articles evaluated.

22 Claims, 24 Drawing Sheets

| VENDOR STYLE | FILE NAME |
|---|---|
| 25194 | GOLD_NECK |
| ⋮ | ⋮ |

FIG.8a

PICTURE DATABASE

| FILE NAME | PICTURE DATA |
|---|---|
| GOLD_NECK | (ACTUAL DATA) |
| ⋮ | ⋮ |

FIG.8b

| QUE STRING | MORE DETAILED RQST | SKIP LIST |
|---|---|---|
| 016 / 03 8631 | 72{251 94 | 016 / 038631 / 25194 |
| ↑ ↑ | ↑ | ⎵ 74 |
| GROUP VENDOR | VENDOR STYLE | |
| 038631 / 005 | 023 | 03863 / 005 / 023 |
| ↑ ↑ | ↑ | |
| VENDOR CATEGORY | CLASS | |
| ⋮ | ⋮ | ⋮ |

70 { (bracket on left of table)

FIG. 11

| ACCESS METHOD | DATA GROUPING FILE |
|---|---|
| TOT KØ } 76 | 78{TOTAL - LEVEL (BRANCH, GROUP, VENDOR) TOTAL DATA |
| CCBKØ | CATEGORY / CLASS - CATEGORY, CATEGORY / CLASS OR CATEGORY / CLASS / LEVEL DATA |
| CCBK1 | CATEGORY / CLASS - LEVEL / CATEGORY / CLASS |
| CSBKØ | CATEGORY / STYLE - CATEGORY, CATEGORY / STYLE OR CATEGORY / STYLE / LEVEL |
| CSBK1 | CATEGORY / STYLE - LEVEL / CATEGORY / STYLE |
| VCBKØ | VENDOR / CATEGORY - VENDOR, VENDOR / CATEGORY OR VENDOR / CATEGORY / LEVEL |
| VCBK1 | VENDOR / CATEGORY - LEVEL / VENDOR / CATEGORY |
| VCBK2 | VENDOR / CATEGORY - STYLE / VENDOR / CATEGORY |

FIG. 12a

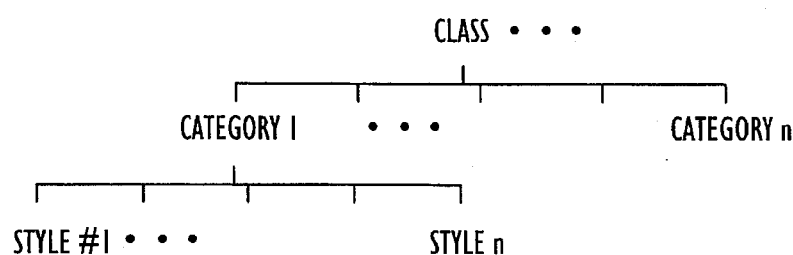

FIG. 12b

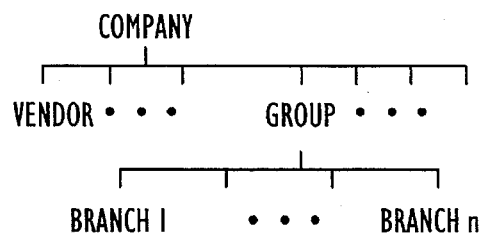

FIG. 12c

FINLAY FINE JEWELRY     BRANCH ANALYSIS TOOLS     TOTAL COMPANY

HOT & NOT
GRP = *

| STD COST | 96 | 94 | 98 | 100 | 102 | 104 | 106 | 108 |
| --- | --- | --- | --- | --- | --- | --- | --- | --- |
| HOT GROUPS | ONHAND COST! | STD COST! | LY STD COST! | %TOT COST OH | %TOT COST STD | %SELL THRU COST | AVG COST OH | AVG COST STD |
| 054 | A⌐20224 | C⌐1575 | 1355 | 5.9 | 8.1 | 7 | 126 | 107 |
| 016 | 29492 | 1510 | 1599 | 8.6 | 7.8 | 5 | 90 | 71 |
| 028 | 22633 | 1506 | 1389 | 6.6 | 7.8 | 6 | 74 | 63 |
| 025 | 29341 | 1472 | 1955 | 8.5 | 7.6 | 5 | 88 | 71 |
| 032 | 18961 | 1243 | 1228 | 5.5 | 6.4 | 6 | 85 | 65 |
| 030 | • 17926 | • 1180 | 1171 | 5.2 | 6.1 | 6 | 88 | 68 |
| 060 | • 18404 | • 1150 | 1278 | 5.4 | 5.9 | 6 | 82 | 71 |
| 021 | • 22505 | • 1112 | 1076 | 6.5 | 5.8 | 5 | 107 | 83 |
| 090 | 12230 | 882 | 690 | 3.6 | 4.6 | 7 | 98 | 83 |
| 043 | 14494 | 792 | 820 | 4.2 | 4.1 | 5 | 87 | 72 |
| 084 | 15560 | 779 | 700 | 4.5 | 4.0 | 5 | 79 | 60 |
| 018 | 14063 | 724 | 855 | 4.1 | 3.7 | 5 | 82 | 63 |
| $1000s! | B⌐343966 | D⌐19336 | 19744 | 100.0 | 100.0 | 5 | 84 | 68 |

F1/F2/F3=UNITS/COST/RETAIL    F4=HOT/NOT    F5=SORT    F6=KEY+    F10=TOT/GRP    11:29:55

FINLAY FINE JEWELRY   BRANCH ANALYSIS TOOLS   TOTAL COMPANY

HOT & NOT
GRP = *

| STD COST HOT GROUPS | 112 ONHAND UNITS | 114 STD UNITS | 116 LY STD UNITS | 118 %TOT UNITS OH | 120 %TOT UNITS STD | 122 %SELL THRU UNITS | 124 LY GM% | 126 GM% |
|---|---|---|---|---|---|---|---|---|
| 054 | E⌐160704 | G⌐14682 | 13370 | 3.9 | 5.1 | 8 | 55.5 | 53.9 |
| 016 | ⌊328414 | ⌊21186 | 22044 | 8.0 | 7.4 | 6 | 57.0 | 56.2 |
| 028 | 304495 | 24024 | 24896 | 7.4 | 8.4 | 7 | 56.6 | 55.7 |
| 025 | •333717 | •20685 | 23894 | 8.2 | 7.2 | 6 | 55.5 | 56.0 |
| 032 | •224207 | •19209 | 18682 | 5.5 | 6.7 | 8 | 56.1 | 55.9 |
| 030 | •203943 | •17464 | 16445 | 5.0 | 6.1 | 8 | 56.5 | 55.7 |
| 060 | 224228 | 16263 | 18390 | 5.5 | 5.7 | 7 | 56.3 | 56.2 |
| 021 | 209624 | 13390 | 12904 | 5.1 | 4.7 | 6 | 56.3 | 56.0 |
| 090 | 124797 | 10662 | 8580 | 3.1 | 3.7 | 8 | 56.2 | 55.2 |
| 043 | 166942 | 11054 | 11292 | 4.1 | 3.9 | 6 | 56.3 | 56.4 |
| 084 | 197887 | 12927 | 11481 | 4.8 | 4.5 | 6 | 57.7 | 56.8 |
| 018 | 170955 | 11479 | 12603 | 4.2 | 4.0 | 6 | 56.0 | 55.4 |
| *** | F⌊4091435 | H⌊285638 | 288618 | 100.0 | 100.0 | 7 | 56.2 | 55.6 |

F1/F2/F3=UNITS/COST/RETAIL   F4=HOT/NOT   F5=SORT   F6=KEY+   F10=TOT/GRP   11.30.18

FIG. 15

FINLAY FINE JEWELRY  BRANCH ANALYSIS TOOLS  TOTAL COMPANY

HOT & NOT

128 { GRP/CAT/CLASS = 054/20/*

| OH COST / HOT CLASSES | ONHAND UNITS | STD UNITS | LY STD UNITS | %TOT UNITS OH | %TOT UNITS STD | %SELL THRU UNITS | LY GM% | GM% |
|---|---|---|---|---|---|---|---|---|
| 001 | 4190 | 265 | 279 | 48.8 | 35.2 | 6 | 55.5 | 54.2 |
| 003 | 1578 | 203 | 115 | 18.4 | 27.0 | 11 | 58.4 | 54.9 |
| 004 | 1508 | 169 | 181 | 17.6 | 22.5 | 10 | 57.0 | 52.6 |
| 002 | 1264 | 112 | 142 | 14.7 | 14.9 | 8 | 58.9 | 54.6 |
| 007 | 40 | 3 | 3 | 0.5 | 0.4 | 7 | 60.5 | 54.8 |
| 005 | 2 | 0 | 0 | 0.0 | 0.0 | 0 | 0.0 | 0.0 |
| 008 | 1 | 0 | 0 | 0.0 | 0.0 | 0 | 0.0 | 0.0 |
| *** | 8583 | 752 | 720 | 100.0 | 100.0 | 8 | 56.8 | 53.9 |

F1/F2/F3=UNITS/COST/RETAIL    F4=HOT/NOT    F5=SORT    F6=KEY+    F10=TOT/GRP    11:30:00

FIG. 16

FINLAY FINE JEWELRY          BRANCH ANALYSIS TOOLS                    TOTAL COMPANY

```
═══════════════════════ HOT & NOT ═══════════════════════
                       GRP/CAT/VND = 054/34/*
```

| GM% | | | | | | | | |
|---|---|---|---|---|---|---|---|---|
| HOT VENDORS | ONHAND UNITS | STD UNITS | LY STD UNITS | %TOT UNITS OH | %TOT UNITS STD | %SELL THRU UNITS | LY GM% | GM% |
| 273100 | 3087  | 266 | 320 | 9.6   | 8.9   | 8  | 58.4 | 59.1 |
| 622800 | 555   | 47  | 57  | 1.7   | 1.6   | 8  | 50.7 | 55.4 |
| 000644 | 242   | 15  | 27  | 0.8   | 0.5   | 6  | 51.4 | 53.1 |
| 360196 | 2982  | 279 | 345 | 9.3   | 9.3   | 9  | 52.4 | 52.7 |
| 183800 | 6     | 1   | 0   | 0.0   | 0.0   | 14 | 0.0  | 52.0 |
| 131000 | 41    | 2   | 3   | 0.1   | 0.1   | 5  | 53.0 | 52.0 |
| 175070 | 53    | 5   | 0   | 0.2   | 0.2   | 9  | 0.0  | 50.5 |
| 193700 | 899   | 155 | 65  | 2.8   | 5.2   | 15 | 49.1 | 49.1 |
| 497900 | 6337  | 689 | 540 | 19.7  | 23.0  | 10 | 50.0 | 48.1 |
| 563800 | 243   | 22  | 22  | 0.8   | 0.7   | 8  | 49.9 | 47.9 |
| 109800 | 7937  | 713 | 633 | 24.7  | 23.8  | 8  | 49.4 | 47.6 |
| 426600 | 990   | 49  | 47  | 3.1   | 1.6   | 5  | 50.3 | 47.4 |
| ***    | 32132 | 3002| 2893| 100.0 | 100.0 | 9  | 48.9 | 47.9 |

F1/F2/F3=UNITS/COST/RETAIL    F4=HOT/NOT    F5=SORT    F6=KEY+    F10=TOT/GRP    11.31:11

FIG. 17

FINLAY FINE JEWELRY        BRANCH ANALYSIS TOOLS              TOTAL COMPANY

===== HOT & NOT =====

GROUP PERCENT TO TOTAL COMPANY
CAT/VND/GRP = 34/109800/*

| HOT GROUPS | ONHAND UNITS | STD UNITS | LY STD UNITS | %TOT UNITS OH | %TOT UNITS STD | %SELL THRU UNITS | LY GM% | GM% |
|---|---|---|---|---|---|---|---|---|
| 032 | 16822 | 1508 | 1472 | 7.7 | 10.4 | 8 | 48.6 | 48.7 |
| 025 | 20675 | 1497 | 1529 | 9.5 | 10.3 | 7 | 49.7 | 49.2 |
| 016 | 18303 | 1277 | 1229 | 8.4 | 8.8 | 7 | 49.3 | 49.3 |
| 030 | 9524 | 968 | 851 | 4.4 | 6.7 | 9 | 48.2 | 49.9 |
| 028 | 13117 | 929 | 975 | 6.0 | 6.4 | 7 | 48.6 | 47.3 |
| 060 | 11455 | 795 | 904 | 5.3 | 5.5 | 6 | 48.0 | 49.6 |
| 054 | 7937 | 713 | 633 | 3.7 | 4.9 | 8 | 49.4 | 47.6 |
| 084 | 11266 | 700 | 642 | 5.2 | 4.8 | 6 | 48.1 | 47.6 |
| 018 | 9472 | 689 | 794 | 4.4 | 4.7 | 7 | 48.6 | 49.2 |
| 021 | 10686 | 619 | 570 | 4.9 | 4.3 | 5 | 48.8 | 49.7 |
| 043 | 9019 | 612 | 498 | 4.2 | 4.2 | 6 | 49.8 | 49.1 |
| 015 | 7799 | 562 | 478 | 3.6 | 3.9 | 7 | 48.7 | 47.7 |
| *** | 217107 | 14515 | 14537 | 100.0 | 100.0 | 6 | 48.8 | 48.9 |

F1/F2/F3=UNITS/COST/RETAIL    F4=HOT/NOT    F5=SORT    F7=PREV    F8=NEXT    F10=GRP    11:31:53

FIG. 18

FINLAY FINE JEWELRY  BRANCH ANALYSIS TOOLS  TOTAL COMPANY

HOT & NOT
GROUP PERCENT TO TOTAL COMPANY
CAT/CLASS/VSTYLE/GRP = 34/021/EH546456D /*

| STD COST | | | | | | | | |
|---|---|---|---|---|---|---|---|---|
| HOT GROUPS | ONHAND COST | STD COST | LY STD COST | %TOT COST OH | %TOT COST STD | %SELL THRU COST | AVG COST STD | AVG COST STD |
| 025 | 4888 | 5734 | 1786 | 6.8 | 15.5 | 54 | 94 | 94 |
| 032 | 5358 | 3384 | 1316 | 7.4 | 9.2 | 39 | 94 | 94 |
| 016 | 6204 | 3196 | 470 | 8.6 | 8.7 | 34 | 94 | 94 |
| 060 | 5358 | 3008 | 376 | 7.4 | 8.1 | 36 | 94 | 94 |
| 030 | 3290 | 2820 | 0 | 4.6 | 7.6 | 46 | 94 | 94 |
| 028 | 4136 | 2632 | 94 | 5.8 | 7.1 | 39 | 94 | 94 |
| 018 | 3572 | 1974 | 282 | 5.0 | 5.3 | 36 | 94 | 94 |
| 054 | 3478 | 1880 | 94 | 4.8 | 5.1 | 35 | 94 | 94 |
| 084 | 2820 | 1504 | 282 | 3.9 | 4.1 | 35 | 94 | 94 |
| 043 | 4324 | 1410 | 0 | 6.0 | 3.8 | 25 | 94 | 94 |
| 092 | 940 | 1316 | 0 | 1.3 | 3.6 | 58 | 94 | 94 |
| 011 | 940 | 1316 | 0 | 1.3 | 3.6 | 58 | 94 | 94 |
| *** | 71926 | 36942 | 6486 | 100.0 | 100.0 | 34 | 94 | 94 |

F1/F2/F3=UNITS/COST/RETAIL  F4=HOT/NOT  F5=SORT  F7=PREV  F8=NEXT  F10=GRP  11:28:32

FIG. 19

FINLAY FINE JEWELRY       BRANCH ANALYSIS TOOLS              TOTAL COMPANY
─────────────────────── HOT & NOT ───────────────────────
                         VND = *

| STD COST | | | | | | | | |
|---|---|---|---|---|---|---|---|---|
| HOT VENDORS | ONHAND COST! | STD COST! | LY STD COST! | %TOT COST OH | %TOT COST STD | %SELL THRU COST | AVG COST OH | AVG COST STD |
| 109800 | 7917 | 2270 | 2056 | 92.9 | 94.5 | 22 | 50 | 47 |
| 109801 | 601 | 132 | 105 | 7.1 | 5.5 | 18 | 48 | 43 |
| 000631 | 1 | 0 | 0 | 0.0 | 0.0 | 0 | 65 | 0 |
| $1000s! | 8518 | 2403 | 2160 | 100.0 | 100.0 | 22 | 50 | 46 |

F1/F2/F3=UNITS/COST/RETAIL    F4=HOT/NOT    F5=SORT    F6=KEY+    F10=TOT/GRP    11:25:10

FIG. 20

| FINLAY FINE JEWELRY | | | BRANCH ANALYSIS TOOLS | | | | TOTAL COMPANY | |
|---|---|---|---|---|---|---|---|---|

HOT & NOT
GRP/CAT/VND = 054/34/*

| STD UNITS | | | | | | | | |
|---|---|---|---|---|---|---|---|---|
| NOT VENDORS | ONHAND UNITS | STD UNITS | LY STD UNITS | %TOT UNITS OH | %TOT UNITS STD | %SELL THRU UNITS | LY GM% | GM% |
| 096130 | 0 | 0 | 5 | 0.0 | 0.0 | 0 | 49.2 | 0.0 |
| 096100 | 0 | 0 | 6 | 0.0 | 0.0 | 0 | 45.3 | 0.0 |
| 454410 | 1 | 0 | 0 | 0.0 | 0.0 | 0 | 0.0 | 0.0 |
| 306600 | 1 | 0 | 0 | 0.0 | 0.0 | 0 | 0.0 | 0.0 |
| 000007 | 1 | 0 | 1- | 0.0 | 0.0 | 0 | 0.0 | 0.0 |
| 499000 | 3 | 0 | 0 | 0.0 | 0.0 | 0 | 0.0 | 0.0 |
| 675910 | 9 | 0 | 7 | 0.0 | 0.0 | 0 | 50.4 | 0.0 |
| 290101 | 27 | 0 | 5 | 0.1 | 0.0 | 0 | 49.2 | 0.0 |
| 183800 | 6 | 1 | 0 | 0.0 | 0.0 | 14 | 0.0 | 52.0 |
| 453000 | 7 | 1 | 3 | 0.0 | 0.0 | 13 | 48.2 | 45.2 |
| 272350 | 5 | 1 | 1 | 0.0 | 0.0 | 17 | 44.4 | 44.4 |
| 609000 | 11 | 1 | 1 | 0.0 | 0.0 | 8 | 41.2 | 44.4 |
| *** | 32132 | 3002 | 2893 | 100.0 | 100.0 | 9 | 48.9 | 47.9 |

F1/F2/F3=UNITS/COST/RETAIL    F4=HOT/NOT    F5=SORT    F6=KEY+    F10=TOT/GRP    11:31:31

FIG. 21

FINLAY FINE JEWELRY      BRANCH ANALYSIS TOOLS      VENDOR

HOT & NOT

VND /CAT/CLASS = 109800/39/*

| AVG STD COST / HOT CLASSES | ONHAND COST | STD COST | LY STD COST | %TOT COST OH | %TOT COST STD | %SELL THRU COST | AVG COST OH | AVG COST STD |
|---|---|---|---|---|---|---|---|---|
| 002 | 3415 | 1231 | 2169 | 100.0 | 100.0 | 26 | 60 | 68 |
| *** | 3415 | 1231 | 2169 | 100.0 | 100.0 | 26 | 60 | 68 |

F1/F2/F3=UNITS/COST/RETAIL    F4=HOT/NOT    F5=SORT    F6=KEY+    F10=TOT/GRP    11:26:53

FIG. 22

| FINLAY FINE JEWELRY | | | BRANCH ANALYSIS TOOLS | | | | GROUP 011 | |
|---|---|---|---|---|---|---|---|---|
| | | | HOT & NOT | | | | | |
| | | | BRN = * | | | | | |
| GM% | | | | | | | | |
| HOT BRANCHES | ONHAND UNITS | STD UNITS | LY STD UNITS | %TOT UNITS OH | %TOT UNITS STD | %SELL THRU UNITS | LY GM% | GM% |
| 005 | 8297 | 1655 | 1800 | 14.5 | 17.9 | 17 | 55.6 | 57.3 |
| 004 | 5306 | 754 | 881 | 9.3 | 8.1 | 12 | 54.2 | 57.1 |
| 001 | 5403 | 792 | 900 | 9.4 | 8.6 | 13 | 55.2 | 57.0 |
| 008 | 4742 | 710 | 835 | 8.3 | 7.7 | 13 | 55.2 | 56.2 |
| 003 | 8268 | 1486 | 1855 | 14.4 | 16.0 | 15 | 54.6 | 56.0 |
| 006 | 5715 | 1024 | 1055 | 10.0 | 11.1 | 15 | 54.7 | 55.6 |
| 002 | 9286 | 1730 | 2109 | 16.2 | 18.7 | 16 | 55.7 | 55.4 |
| 007 | 5727 | 855 | 861 | 10.0 | 9.2 | 13 | 56.6 | 54.8 |
| 092 | 0 | 256 | 0 | 0.0 | 2.8 | 100 | 0.0 | 9.7 |
| 075 | 1947 | 0 | 0 | 3.4 | 0.0 | 0 | 0.0 | 0.0 |
| 069 | 147 | 0 | 0 | 0.3 | 0.0 | 0 | 0.0 | 0.0 |
| 000 | 2402 | 0 | 0 | 4.2 | 0.0 | 0 | 0.0 | 0.0 |
| *** | 57240 | 9262 | 10296 | 100.0 | 100.0 | 14 | 55.3 | 55.1 |

F1/F2/F3=UNITS/COST/RETAIL    F4=HOT/NOT    F5=SORT    F6=KEY+    F10=GRP/BRN    11:55:24

FIG. 23

| FINLAY FINE JEWELRY | | BRANCH ANALYSIS TOOLS | | | | | GROUP 011 | |
|---|---|---|---|---|---|---|---|---|
| | | HOT & NOT BRANCH PERCENT TO GROUP CAT/CLASS/BRN = 34/010/* | | | | | | |
| HOT BRANCHES | ONHAND UNITS | STD UNITS | LY STD UNITS | %TOT UNITS OH | %TOT UNITS STD | %SELL THRU UNITS | LY GM% | GM% |
| 004 | 108 | 13 | 13 | 8.6 | 5.0 | 11 | 51.5 | 54.6 |
| 007 | 106 | 17 | 38 | 8.5 | 6.6 | 14 | 53.8 | 53.6 |
| 001 | 127 | 25 | 37 | 10.2 | 9.7 | 16 | 54.5 | 53.5 |
| 005 | 147 | 56 | 42 | 11.8 | 21.7 | 28 | 53.9 | 53.3 |
| 008 | 100 | 28 | 33 | 8.0 | 10.9 | 22 | 52.6 | 53.1 |
| 003 | 175 | 45 | 70 | 14.0 | 17.4 | 20 | 51.6 | 52.9 |
| 002 | 214 | 56 | 68 | 17.1 | 21.7 | 21 | 52.6 | 52.8 |
| 006 | 113 | 17 | 28 | 9.0 | 6.6 | 13 | 51.7 | 52.8 |
| 092 | 0 | 1 | 0 | 0.0 | 0.4 | 100 | 0.0 | 16.8 |
| 000 | 32 | 0 | 0 | 2.6 | 0.0 | 0 | 0.0 | 0.0 |
| 069 | 1 | 0 | 0 | 0.1 | 0.0 | 0 | 0.0 | 0.0 |
| 075 | 128 | 0 | 0 | 10.2 | 0.0 | 0 | 0.0 | 0.0 |
| *** | 1251 | 258 | 329 | 100.0 | 100.0 | 17 | 52.7 | 52.9 |

F1/F2/F3=UNITS/COST/RETAIL   F4=HOT/NOT   F5=SORT   F7=PREV   F8=NEXT   F10=BRN   01:03:21

FIG. 24

PRODUCT EVALUATION SYSTEM

BACKGROUND OF THE INVENTION

1. Field of the Invention

The present invention generally relates to the field of determining or evaluating the popularity or commercial successfulness of products or articles, and in particular, the present invention relates to a product evaluation system which is able to evaluate and determine how successful a particular category, class or style of an article, such as jewelry, is performing in the marketplace for a particular selling location or geographic area.

2. Background of the Related Art

In today's competitive marketplace, there is a trend for companies to stress or emphasize their ability to meet the customer's needs or requests within a short period of time. The more preferable situation, however, is not to fulfill a customer's request within a short period of time, but rather, it is preferred to anticipate the customer's needs in the future and have readily available the particular desired goods so that the customer does not have to wait any period of time whatsoever before purchasing the goods. By providing the ability to immediately fulfill or satisfy the customer's request or order, suppliers or distributors and retailers or dealers are able to provide the customer with the ability to purchase products on an impulsive basis.

Most businesses recognize the clear advantages of providing customers the ability to purchase products on an impulsive basis. Impulsive shopping is particularly important in the fashion industry, such as fashion jewelry, where trendy styles of jewelry may have only a relatively short life cycle. Thus, in the fashion industry in particular, retailers that are unable to sell to customers due to lack of inventory on hand often lose their potential sales and are unable to recapture these lost sales at a later time due to the impulsive nature of customers in the fashion market arena.

Unfortunately, in today's environment, distributors and dealers are so occupied and overwhelmed in their day to day activities, it is difficult to expend or invest the time and resources in determining or evaluating the successes and failures of particular categories and classes of fashions or particular styles of fashions in a timely manner. This is especially true for distributors and dealers that are principally concerned with replenishing or restocking inventory in a frequent manner, such as on a weekly basis. Thus, a substantial part of a supplier's or retailer's activity is expended to insure that an adequate supply of inventory is available for sale to the customer.

As indicated above, due to the time constraints on the distributor and dealer and due to the dynamic sales activities particularly related to the fashion industry, distributors and dealers are forced to guess or crudely estimate which types of fashion articles will be stocked or inventoried, as well as the specific quantity for each of the inventoried fashion articles. As a result, distributors often supply and dealers often order specific fashion articles which are unlikely to be purchased in the future. This causes the dealer to overstock a particular fashion article. Depending upon the relationship between the dealer and the distributor, the dealer may then return the overstocked items to the distributor who must then attempt to resell these overstock fashion articles to another dealer or the dealer will absorb the loss of overstocking. Thus, the overall profitability of both the distributor and the dealer may thereby be significantly reduced.

In addition, since both the distributor and the dealer are unable to accurately or precisely determine or evaluate the performance, i.e., the success, of different categories of fashion articles as well as different styles of fashion articles, at times, the distributor and dealer are unable to predict or identify a particular fashion article which is performing or selling exceptionally well. In these instances, the dealer becomes understocked with this particular fashion item and is unable to effectuate as many sales since the demand of the fashion article far exceeds the supply on hand at the dealer location. If the distributor or dealer was able to determine in advance that a particular fashion article was performing exceptionally well, the distributor would be able to manufacture or obtain additional amounts of the fashion article for resale to the customer. Thus, in the situation where the dealer or distributor is unable to identify a particular commercially successful fashion article, both the dealer and distributor are prevented from effectuating increased amounts of sales, again resulting in reduced profitability to both the dealer and distributor.

As indicated above, due to the dynamic aspects of retail sales, particularly with respect to fashion articles, distributors and dealers are overwhelmed in their daily activities and have not seriously considered and are unable to access the sales performance of particular articles in an efficient manner as well as on a timely basis, such as every week. That is, since the dealers and distributors are typically involved in the management of excessive information relating to inventory numbers, pricing, distributing and selling the fashion articles, they have not considered and are unable to accurately assess in detail which fashion articles are performing well to determine, for example, that additional stock above the normal inventory levels should be maintained by the dealer. Further, dealers and distributors have not seriously considered and are unable to accurately determine which fashion articles are not performing well for which no additional stock should be inventoried by the dealer, and for which the particular fashion article should be discontinued or phased out.

Much of the problems associated with the above inabilities of dealers and distributors to accurately assess the performance of different fashion articles relate in large part to the massive amounts of data to be compiled and organized in an efficient and timely manner, preferably on a week-to-week basis. An additional problem confronting dealers and distributors particularly in the fashion industry is associated with differentiating between fashion articles which may be selling at a higher rate or sale price than other fashion articles, but having a lower profitability margin. In this situation, even though a particular fashion article is selling well with respect to the number of sales, this particular fashion may not be preferred since it has a lower profitability margin than other fashion articles. Presently, however, dealers and distributors have been unable to recognize this particular problem and solve it since they have been so occupied in the crude process of restocking of inventory.

A further previously unrecognized problem which therefore has been ignored by dealers and distributors relates to determining the best performing fashion article styles to predict future performance of specific styles or categories of fashion articles likely to be successful in the future. Additionally, it is impossible to compare different styles to each other to determine which categories or styles of fashion articles may be preferred by customers. Further, it has been impossible to relate different fashion articles together, individually or in groups to determine whether any relationship exists between the different fashion articles which might further indicate clarify why particular categories or styles of fashion articles have been successful. This relationship might also indicate which combinations of fashion articles might be sold together to further capitalize on current successful fashion articles by combining successful fashion articles with respect to category and style in an effective marketing program.

It may also be possible that based on the relationship between different successfully performing fashion articles, that newer fashion article designs combining the different popular features of the different fashion articles performing successfully may be developed. It has been impractical in the past to determine which specific styles or designs of fashion articles are performing successfully to determine which styles are particularly valuable and which require intellectual property protection, such as for instance, copyright or design patent protection.

Accordingly, it is desirable to efficiently organize and compile data relating to the performance of different fashion articles in a timely manner to permit dealers and distributors to determine the popularity or success of a particular fashion article with respect to various decision criteria such as the performance of a particular selling location, class, style or category of fashion article. It is further desirable to determine the success or lack thereof of a particular fashion article based upon the quantity of articles sold in comparison to the profitability margin for a particular article. It is also desirable to provide a system for determining which styles of fashion articles are successful in order to predict future performance of specific styles, categories or classes of fashion articles which are likely to be successful in the future. It is also desirable to compare different styles of fashion articles to determine customer preference. It is further desired to be able to determine whether particular relationships exist between successful fashion articles to extrapolate which combinations of fashion articles might be sold together.

It is also desirable to predict new fashion article designs which are likely to be successful based upon existing successful fashion articles. It is also desirable to determine which styles of different fashion articles may be particularly valuable, and therefore, requiring intellectual property protection.

SUMMARY OF THE INVENTION

It is a feature and advantage of the present invention to provide a practical solution to evaluating the commercial success or lack thereof of articles.

It is another feature and advantage of the present invention to efficiently organize and compile data relating to the performance of different articles in a timely manner to permit dealers and distributors to determine the popularity or success of a particular article.

It is another feature and advantage of the present invention to provide a system for determining which styles of articles are successful in order to predict future performance of specific styles, categories or classes of articles which are likely to be successful in the future.

It is another feature and advantage of the present invention to be able to determine whether particular relationships exist between successful articles to extrapolate which combinations of articles might be sold together.

It is also a feature and advantage of the present invention to predict new article designs which are likely to be successful based upon existing successful articles.

It is a further feature and advantage of the present invention to determine which type of styles of different articles may be particularly valuable, and therefore, requiring intellectual property protection.

The present invention is based, in part, on identification of the problem of being able to effectively and efficiently manage large quantities of data which relate to the successfulness or lack thereof of particular articles. Based upon the identification of this problem, the present invention efficiently organizes different data relating to the performance of articles in an effective and efficient manner which facilitates compilation and presentation of this data for evaluation by the users such as a dealer or distributor. In this respect, the present invention classifies articles in classes, categories, and specific styles.

Under the principles of the present invention, a class of article represents a broad span of articles, such as diamond jewelry. A category of article represents a specific set of articles within a class. For example, if a designated class is diamond jewelry, a category within the class of diamond jewelry might be diamond watches. Finally, a style of an article is provided which represents a particular design of the article which belongs to a specific category. For example, an article style might be diamond watches of one carat or less within the category of diamond watches which is within the class of diamond jewelry.

By providing this classification or designation structure, the present invention is able to effectively and efficiently evaluate the performance of articles with respect to classes, categories, and styles. Further, the present invention is able to effectively and efficiently analyze and evaluate the performance of different selling locations which are responsible for selling these different types of articles. As a result, the present invention is able to permit dealers and distributors to effectively stock the appropriate inventory to optimize the amount of sales and minimize the amount of stock on hand which is not necessary.

The present invention provides the product evaluation system using an effective and efficient computer architecture which facilitates the management of these massive amounts of data. Further, the present invention includes a user friendly interface which permits users of the evaluation system, such as dealers and distributors, to efficiently extrapolate the needed data as well as the ability to efficiently navigate between the different evaluation schemes to facilitate user interaction. Thus, the user is able to quickly and efficiently derive the needed data in order to evaluate the performance of the classes, categories and styles of articles in an effective manner. Advantageously, the present invention also permits users to view the style of the article.

To achieve these other features and advantages of the present invention, a computer architecture is provided for an evaluation system evaluating the success and lack thereof of an article. The computer architecture includes a request retriever receiving an evaluation request to evaluate the success and lack thereof of the article, and generating a formatted evaluation request, a controller receiving the formatted evaluation request from the request retriever, and a skip list data base storing skip lists. In addition, the computer architecture includes a request generator receiving the formatted request from the controller, generating a skip list responsive to the formatted request and the skip lists stored in the skip list data base, and notifying the controller that the skip list has been generated. A main data base is provided which stores evaluation data regarding the success and lack thereof of the article, and a data gatherer receives a retrieve request generated by the controller responsive to the controller being notified that the skip list has been generated. The data gatherer also obtains the skip list from the request generator responsive to the retrieve request received from the controller, and retrieves requested evaluation data from the evaluation data stored in the main data base responsive to the skip list for evaluating the success and lack thereof of the article.

In addition, the present invention includes a computer implemented product evaluation system. The computer implemented product evaluation system includes a data base storing evaluation data of products, and a data processor responsively connected to the data base, receiving a request to evaluate the success and lack thereof of one of the products, evaluating the success and lack thereof of the one of the products, and generating an evaluation result. The evaluation result indicates the success and lack thereof of the product with respect to at least one of the following: category, and class of the product, and group and branch selling locations and vendor. Further, a display device is provided which is connected to the data processor, receiving the evaluation result from the data processor, and displaying the evaluation result for the one of the articles evaluated. Advantageously, the product in the present invention may be a fashion article, and the fashion article may be further evaluated with respect to style.

In another embodiment of the present invention, a computer implemented method of evaluating products is provided, and includes storing evaluation data of the products, receiving a request to evaluate the success and lack thereof of one of the products, and evaluating the success and lack thereof of the one of the products. In addition, the method includes generating an evaluation result indicating the success and lack thereof of the product with respect to at least one of the following: category, and class of the product, and group and branch selling locations and vendor, and displaying the evaluation result for the one of the articles evaluated.

In another embodiment of the present invention, an interactive computer implemented interface system for evaluating the success and lack thereof of a product, interactively with a user, is provided. The interface system, for example, includes requesting the user to select one of category and vendor for evaluating the product, and responsive to the user selecting the category displaying first evaluation data relating to the performance of the product with respect to the category, and prioritizing the first evaluation data responsive to user selection with respect to at least one of retail, cost and units. The interface system also includes requesting the user to select at least one of class, internal style, vendor style, and vendor for further evaluating the product with respect to category, and displaying second evaluation data relating to the performance of the product with respect to the at least one of class, internal style, vendor style, and vendor and with respect to the category. Further, the interface system includes prioritizing the second evaluation data responsive to user selection with respect to at least one of retail, cost and units.

In a further embodiment of the present invention, a memory storing data for access by a product evaluation application program being executed on a data processing system is provided. The memory includes a first data structure stored in the memory, the first data structure including first information resident in a database used by the application program and including: class specific data objects and category specific data objects. The memory further includes a second data structure stored in the memory, the second data structure including second information resident in the database used by the application program and including: company specific data objects, vendor group specific data objects, and branch specific data objects. The first and second data structures establish different hierarchies the various data objects.

A further embodiment of the present invention includes a method of reusing a product evaluation application program on different work stations by accessing different data to provide different evaluations responsive to the different data. The method includes storing the product evaluation application program on group and vendor computers, and downloading group specific data to the group computer and vendor specific data to the vendor computer. In addition, the method includes executing the product evaluation application program at the group computer using the group specific data to evaluate the products with respect to group performance, and executing the product evaluation application program at the vendor computer using the vendor specific data to evaluate the products with respect to vendor performance.

These, together with other objects and advantages which will subsequently be apparent, reside in the details of construction and operation as more fully hereinafter described and claimed, with reference being had to the accompanying drawings forming a part hereof, wherein like numerals refer to like elements throughout.

BRIEF DESCRIPTION OF DRAWINGS

FIG. 8a is a diagram of the relationship between vendor style and file name stored in the cross-reference pointer data base;

FIG. 8b is a diagram indicating the relationship between the file name and picture data stored in the picture data base;

FIG. 11 is a diagram illustrating the relationship between the queue string and skip list in accordance with the principles of the present invention;

FIG. 12a is a diagram illustrating the relationship between the access methods and data grouping files in accordance with the principles of the present invention;

FIG. 12b is a diagram illustrating the data structure of the articles of the present invention;

FIG. 12c is a diagram illustrating the data structure of the selling/purchasing entities of the present invention;

FIG. 14 is a diagram generated by the product evaluation system of the present invention illustrating "hot" groups as prioritized in accordance with season to date (STD) costs for viewing by corporate personnel;

FIG. 15 is a diagram generated by the product evaluation system of the present invention illustrating season to date units for the "hot" groups prioritized in FIG. 14 for viewing by corporate personnel;

FIG. 16 is a diagram generated by the product evaluation system of the present invention illustrating "hot" classes of product articles with respect to a particular group and category as prioritized by units on hand for viewing by corporate personnel;

FIG. 17 is a diagram generated by the product evaluation system of the present invention illustrating "hot" vendors for a particular group and category of product articles as prioritized with respect to percentage of gross margin which is designed for viewing by corporate personnel;

FIG. 18 is a diagram generated by the product evaluation system of the present invention which illustrates "hot" groups with respect to a specific category and vendor as prioritized with respect to season to date units which have been sold for viewing by corporate personnel;

FIG. 19 is a diagram generated by the product evaluation system of the present invention illustrating "hot" groups with respect to a specific category, class and style of product article and prioritized with respect to season to date costs for viewing by corporate personnel;

FIG. 20 is a diagram generated by the product evaluation system of the present invention illustrating hot vendors for viewing by corporate personnel;

FIG. 21 is a diagram generated by the product evaluation system of the present invention illustrating "not" vendors with respect to a particular selling group and category as prioritized with respect to season to date units for viewing by corporate personnel;

FIG. 22 is a diagram generated by the product evaluation system of the present invention illustrating "hot" classes for a specific vendor and category as prioritized with respect to average costs for season to date for viewing by vendors;

FIG. 23 is a diagram generated by the product evaluation system of the present invention illustrating "hot" branches as prioritized with respect to percentage of gross margin for viewing by a group selling location; and FIG. 24 is a diagram illustrating hot branches with respect to a specific category and class of article as prioritized with respect to percentage of gross margin for viewing by a group selling location.

DESCRIPTION OF THE PREFERRED EMBODIMENTS

The present invention is based on identifying the problem of being able to effectively and efficiently manage large quantities of data which relate to the particular performance of product articles. It has been discovered that by classifying product articles under a hierarchial structure, significant efficiency will result when attempting to evaluate the success or performance of product articles. In particular, the hierarchy of classification which has been discovered involves a first broad classification referred to as a "class" of product articles which represents a broad collection of product articles, such as diamond jewelry. A second more detailed classification of the product article is then utilized which is called a "category" which represents a specific set of product articles within the class. For example, if a designated class is diamond jewelry, a category within the class of diamond jewelry might be diamond watches. Finally, a "style" of a product article which represents a particular design of the product article is further defined. For example, a product article style might be diamond watches of one carat or less within the category of diamond watches and within the class of diamond jewelry.

While the above classification scheme has been described in connection with fashion articles, it should be clear that the present invention is applicable for any types of articles or products that may be classified into, for example, classes and categories. For example, with respect to tools, the class might be tools, the category might be hammers and the style might be metal handle with rubber grip. Similarly, with respect to food, the class might be snacks, the category might be cake, and the style might be diet or low fat. Thus, the present invention encompasses or may be used with many different articles.

It has been discovered that by providing this designation structure for product articles, an efficient and effective evaluation system may be designed, the details of which are discussed below.

Figure 1:
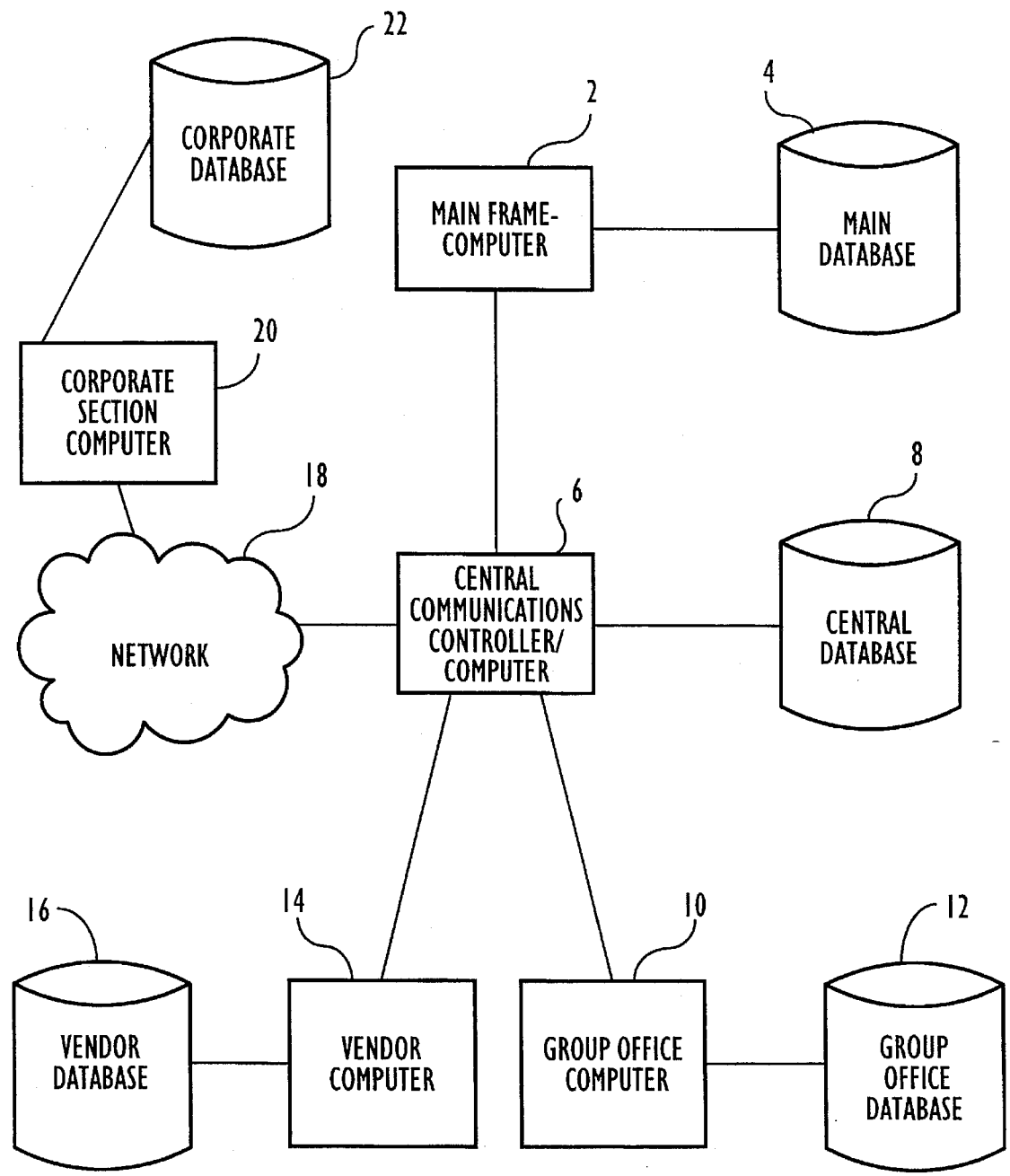
FIG. 1 is a block diagram of the basic hardware configuration of the present invention.

FIG. 1 is a block diagram of the basic hardware configuration of the present invention which has been designed to manage data relating to product articles in accordance with the above data designation structure. In FIG. 1, mainframe computer 2 collects general information regarding day to day operations of corporate headquarters, vendors and group selling locations including the detailed data regarding the performance of different product articles. Mainframe computer 2 stores this information in main data base 4. Upon request from central communications controller 6, mainframe computer 2 downloads the necessary data relating to the evaluation of the product articles to central communications controller 6 which then stores this data in central data base 8. Central communications controller 6 contains the necessary data for implementing the product evaluation system of the present invention itself, while also being able to download this information to other locations as well. For example, group selling locations will want to determine how well product articles are selling in order to determine whether additional stock is necessary to maximize sales to customers. Accordingly, group office computer 10 is provided which receives group specific data downloaded from central communications controller 6. The downloaded group specific data is stored in group office data base 12. Thus, the group selling location is able to determine the performance of all the stores or branches within the geographic area of the group. Advantageously, central communications controller 6 only sends group office computer 10 data relating to that specific group and collection of branches or stores within the group.

In addition, the product evaluation system also permits vendors to receive data regarding the performance of product articles from central communications controller 6 via vendor computer 14. Vendor computer 14 only receives data regarding product articles which are specific to that particular vendor. Thus, vendor computer 14 is able to determine which of its own styles are successful, and which groups and branches are performing well for specific vendor styles. Vendor computer 14 includes vendor data base 16 for storing the vendor specific data.

Further, to permit corporate personnel of the home office which coordinates the distribution of the product articles to the group selling locations via orders requested from the vendors, corporate section computer 20 is provided which, preferably interfaces with central communications controller 6 via network 18. Any standard network may be utilized, such as a local area network provided by Novell. Corporate section computer 20 receives corporate specific data from central communications controller 6 which is generally data relating to more general performance of the group locations as opposed to a particular branch or store within a group. The corporate specific data are downloaded to corporate data base 22. Central communications controller 6, group office computer 10, vendor computer 14 and corporate section computer 20 may be any standard computer, and preferably includes a 286 type microprocessor manufactured, for example, by Intel with at least 640K random access memory (RAM) utilized within an MS-DOS environment provided by Microsoft Corporation.

Advantageously, each of the computer architectures used to implement the present invention and which reside in central communication controller 6, group office computer 10, vendor computer 14 and corporate section computer 20, are preferably identical with the exception that the data which is utilized by each of these locations is location specific. Thus, the same computer architecture can be maintained since it is only the data which preferably varies depending on each of the different locations.

Thus, the present invention is able to be more easily maintained and further developed by computer information personnel since there is only one architecture which is used in all locations. Of course, the present invention does encompass the downloading of all data to all locations, and placing the filtering controls in the location specific computers; however, this alternative is less preferable. Standard programming techniques may be utilized to populate the data screens described below and which are capable of compensating for the different location specific data. In particular, standard programming techniques are available which can manage or compensate for missing or nonavailable data. For example, even though the same computer architecture is preferably utilized, a group location will only receive its own group specific data, and not data relating to other groups.

Figure 2:
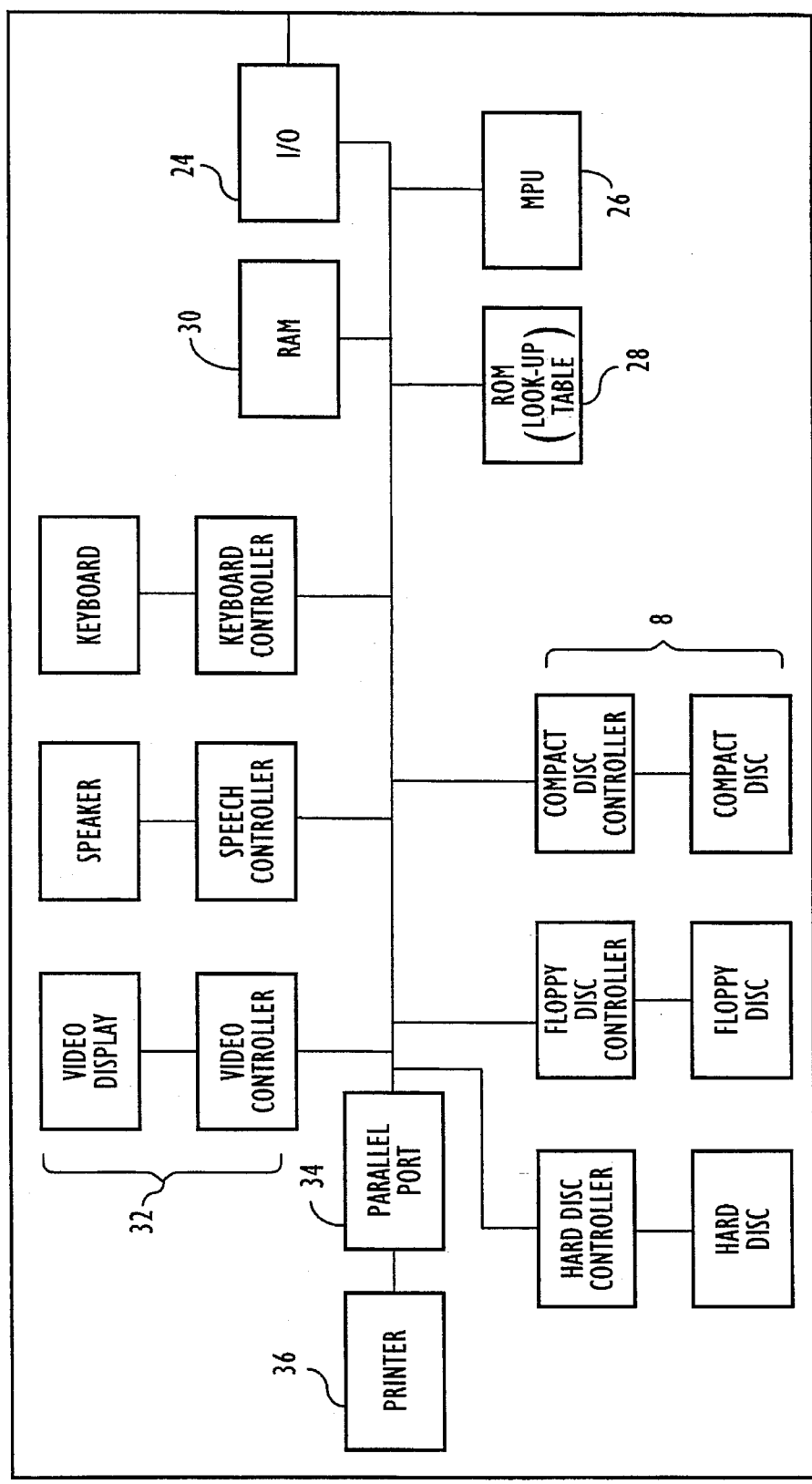
FIG. 2 is a block diagram of the basic hardware configuration of central communications controller of the present invention.

FIG. 2 is a block diagram of the basic hardware configuration of, for example, central communications controller 6 of the present invention. In FIG. 2, central communications controller 6 inputs and outputs data via I/O (input/output) 24. Main processing unit (MPU) 26 implements various processes which are stored in random access memory (RAM) 30. In addition, read only memory (ROM) 28 is provided which may be used for storing look up tables which are referred to by main processing unit 26. RAM 30 is loaded with processing instructions received from storage devices 8 using or under the control of the appropriate storage device controller. For example, executable copies of the processing instructions may be stored on a hard disk of the computer, floppy disk which is inserted in the floppy disk drive of the computer, or a compact disk. Central communications controller 6 further includes interface mechanisms 32 which comprise one or more of video display, speakers and a keyboard and under the control of the respective controller. Finally data is output to printer 36 via parallel port 34. Note that while FIG. 2 illustrates main processing unit 26 as a single processor, MPU 26 may also be comprised of a collection of processors working in coordination as will be discussed in greater detail below.

Figure 3:
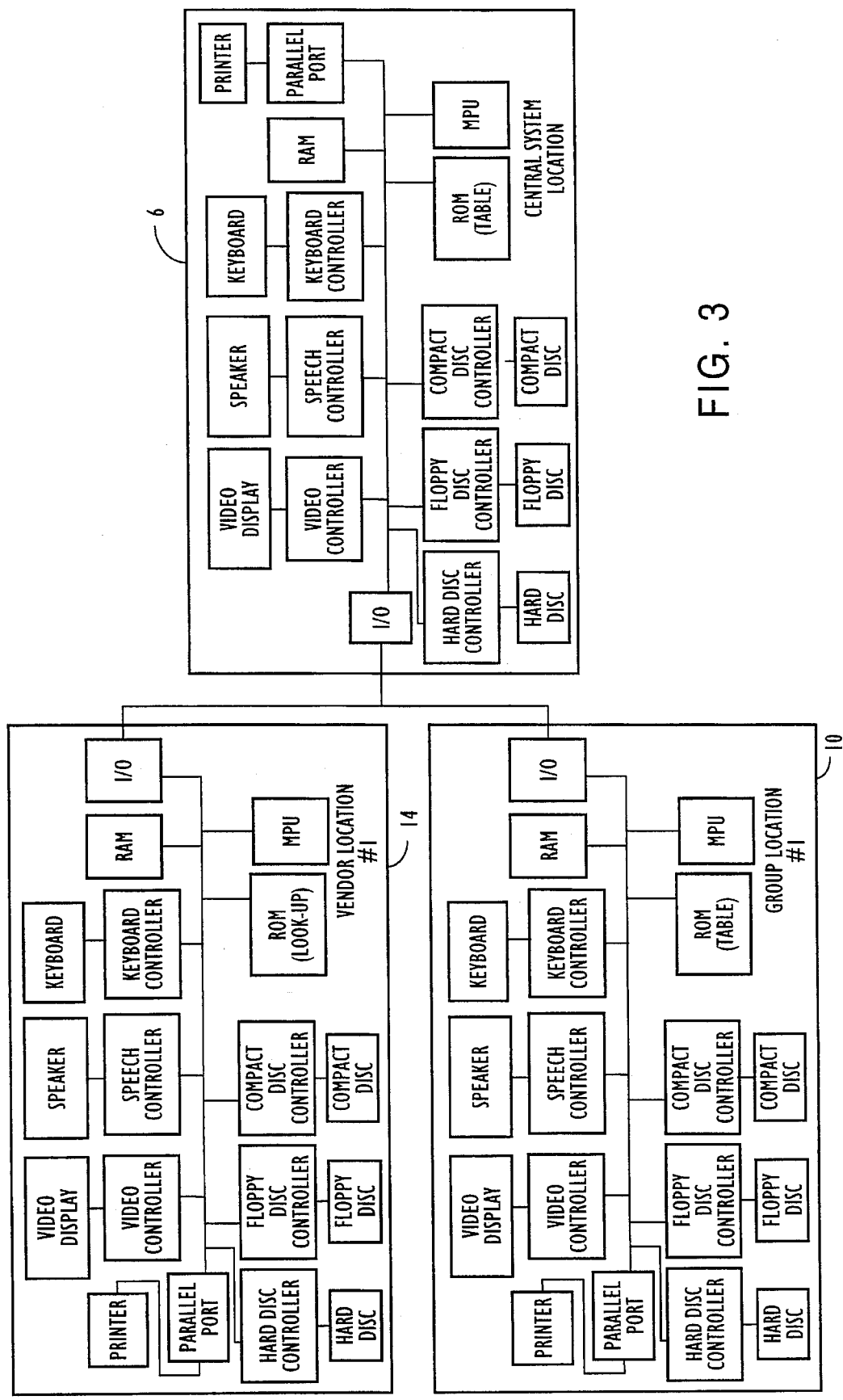
FIG. 3 is a block diagram of central communications controller, group office computer and vendor computer of the present invention.

FIG. 3 is a block diagram of the central communications controller, group office computer, and vendor computer illustrating the general connections between these various computers. As shown in FIG. 3, central communications controller 6 is connected via its input/output unit to the input/output units of group office computer 10 and vendor computer 14. Thus, central communication controller 6 is able to download data to the group office computer 10 or the vendor computer 14. Once the data is downloaded, group office computer 10 and vendor computer 14 are then able to perform the product evaluation using the product evaluation system of the present invention.

Figure 4:
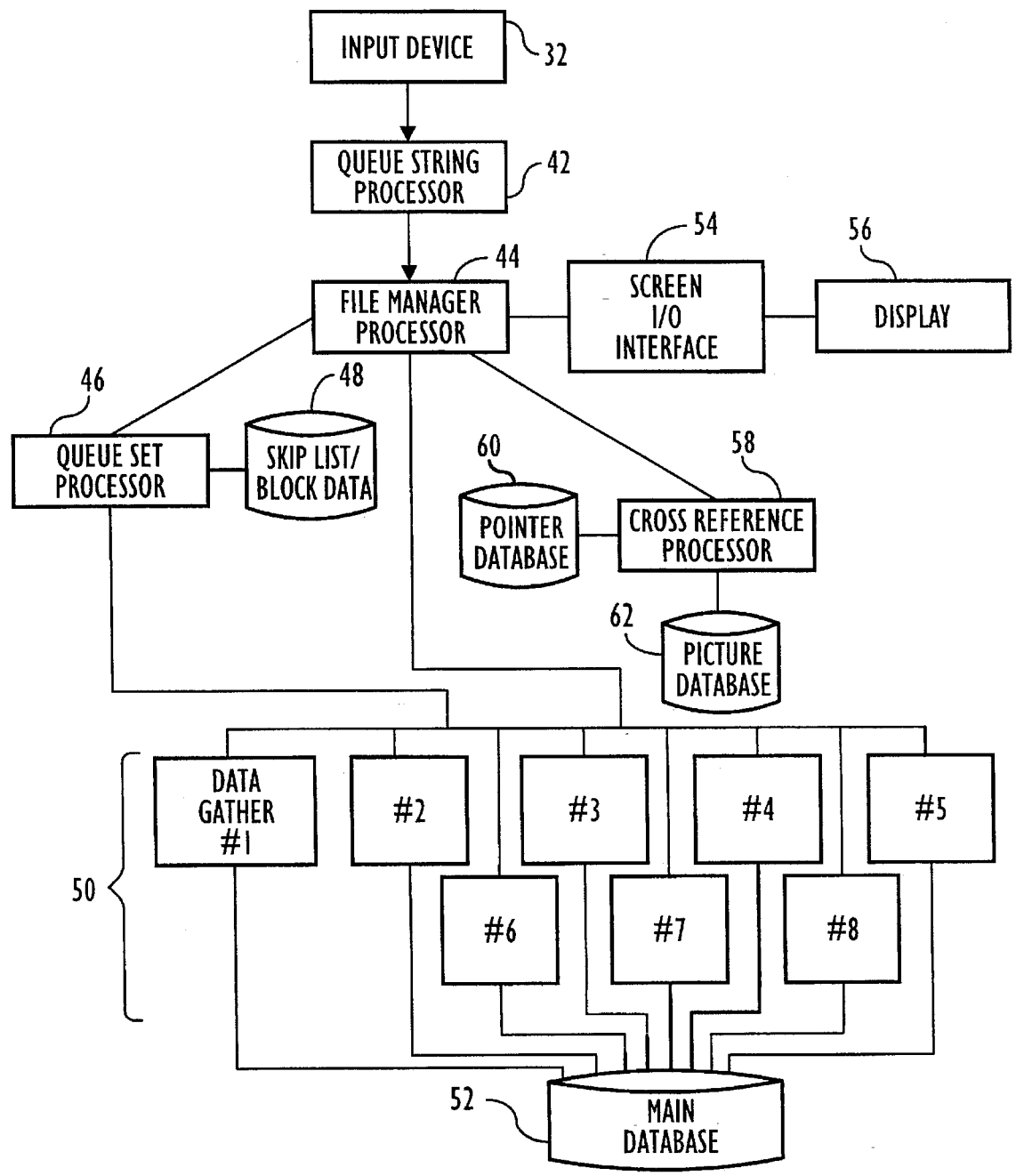
FIG. 4 is a detailed block diagram of the hardware or software architecture for the processor of the product evaluation system of the present invention.

FIG. 4 is a detailed block diagram of the hardware or software architecture for the processor of the product evaluation system of the present invention. In FIG. 4, a request is received from input device 32 for evaluating a particular product article. The request is input to queue string process 42 which generates or formats the request for prompt processing by file manager process 44. File manager process 44 processes the request and interacts, as will be discussed below, with queue set process 46 which is used to build a skip list based upon or using skip list data base 48. File manager 44 also interacts with eight (8) data gathering modules 50 which are used to obtain the requested data for evaluating the performance of the product article from main data base 52. Main data base 52 preferably comprises different files of data which facilitate the retrieving of the data from main data base 52 by data gathering modules 50. Alternatively, main data base 52 may simply be considered as a single storage area for all the data which is retrieved by data gathering modules 50. Once file manager 44 receives the necessary data for evaluating the product article, the data is then output to screen I/O interface 54 which formats the data for display on display 56. Screen I/O interface 54 may be any standard I/O interface, such as the I/O interface developed by Computer Associates.

As described previously, the product evaluation system of the present invention also includes the ability to display a picture of the product article which is under analysis. Accordingly, cross reference process 58 is employed which receives the request for obtaining data with respect to a particular product article style from file manager 44. Cross reference process 58 obtains a pointer indicating preferably the file where the data resides relating to a specific product article style from pointer data base 60. Cross reference process 58 then retrieves the data from picture data base 62 using the pointer and transmits the data to file manager 44 for viewing on display 56 via screen I/O interface 54.

While the product evaluation system of the present invention preferably utilizes or implements the above architecture in software, the product evaluation system of the present invention may also utilize the above architecture as illustrated in FIG. 4 by coordinating dedicated processors for accomplishing one or more of the above-described functions. In this situation, FIG. 4 represents a combination of dedicated, specialized processors used in coordination to perform the product evaluation process of the present invention.

Figure 5:
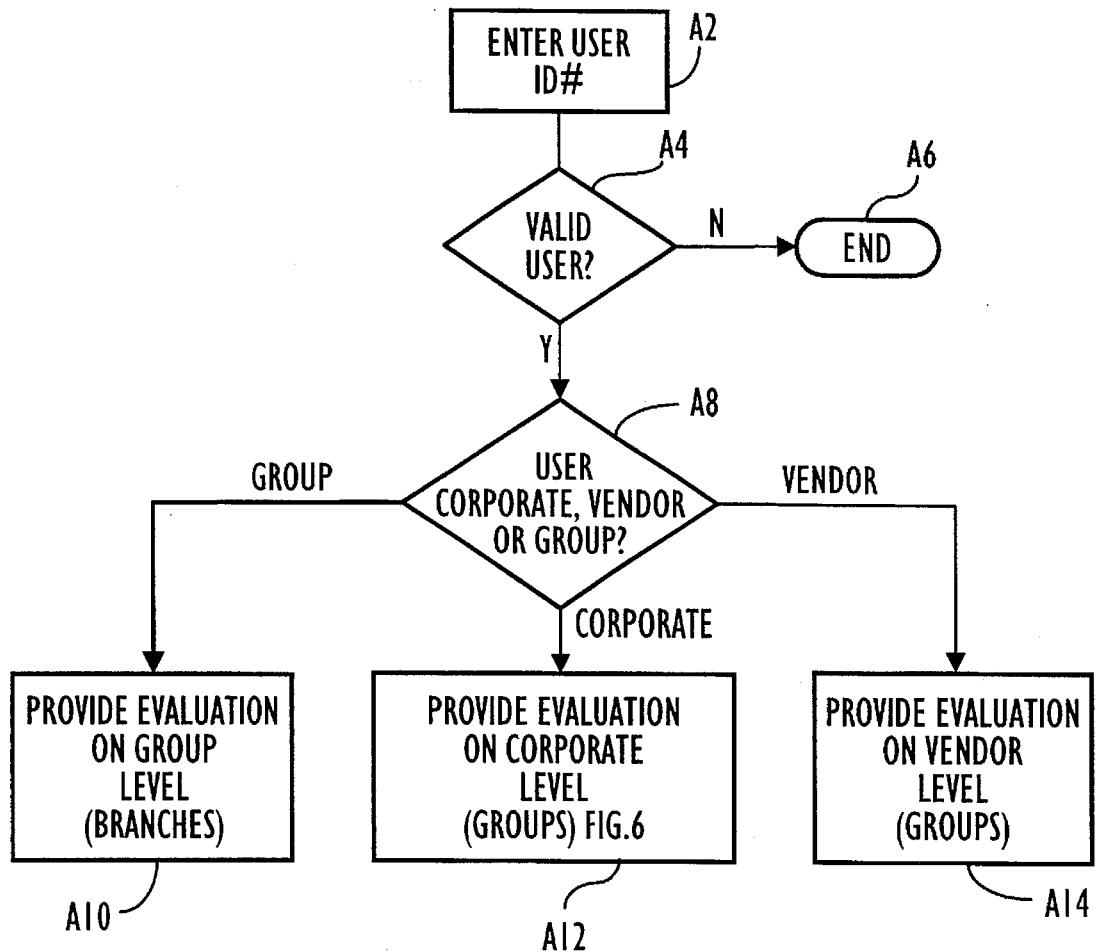
FIG. 5 is a flow chart of the user identification process of the present invention.

FIG. 5 is a flow chart of the user identification process of the present invention. As shown in FIG. 5, a user enters their identification number in step A2 which is input, for example, to main processing unit 26 via I/O 24. Main processing unit 26 then determines whether the user ID (identifier) is authorized in step A4, and if the user is not authorized, the user identification process ends in step A6. The user authorization processes are standard in the art, and therefore, no additional discussion is considered necessary. For example, if as indicated, the user ID is input to central communications controller 6, the set or collection of authorized users is likely personnel located at the home office which will have different user IDs belonging to a class of authorized IDs relating specifically to home office personnel.

If the user is determined to be authorized by main processing unit 26 in step A4, it may then be determined whether the user is a corporate, vendor or group employee for an additional verification step or in the event different personnel are permitted to access different computers which run or implement the product evaluation system of the present invention. For example, if corporate personnel are touring or inspecting a group office, the corporate personnel may still desire to implement the product evaluation system in the same manner as implemented by the corporate computer on group premises for various reasons. Once it is determined who the user is, the product evaluation system of the present invention is implemented in a similar manner for the group level in step A10, for the corporate level in step A12 and for the vendor level in step A14. The process of the product evaluation system of the present invention is preferably similar for all types of users, with the only exception being that different users have access to different data. However, other permutations of allowing users access to data may be contemplated as well.

Figure 6:
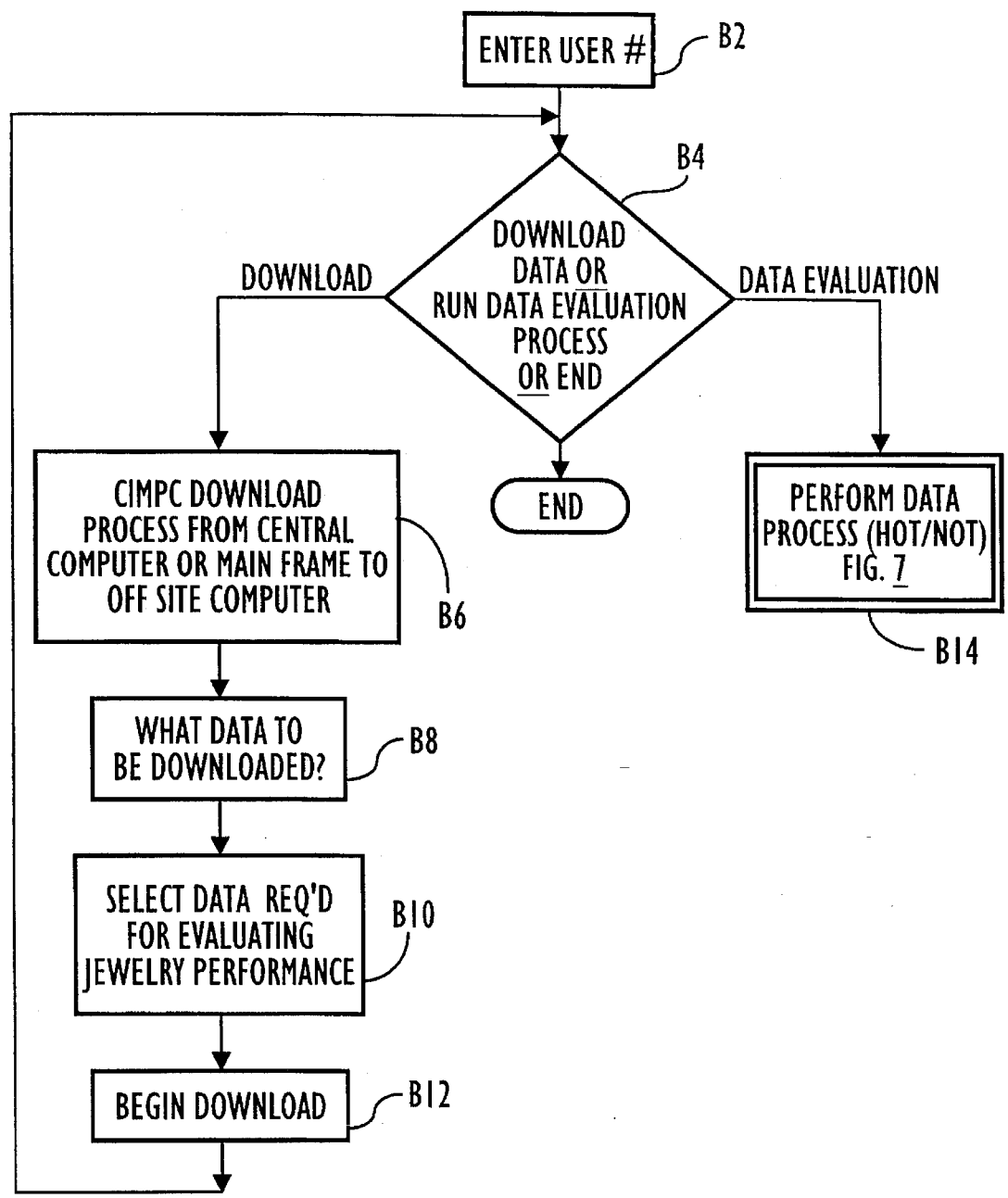
FIG. 6 is a flow chart of the overall process of the product evaluation system of the present invention.

FIG. 6 is a flow chart of the overall process of the product evaluation system of the present invention. In FIG. 6, the user identification process is implemented in step B2, and the user is then requested whether data is to be down loaded or whether the product evaluation process is to be implemented in step B4. As indicated previously in connection with FIG. 1, main frame computer 2 stores data relating to the performance of product articles in main data base 4 and down loads that data to central communications controller 6 which performs the coordination of down loading data to user locations, such as group office computer 10, vendor computer 14 and corporate section computer 20.

If data is determined or requested to be down loaded in step B4, the down load process is initiated in step B6 from central computer 6. The specific data to be down loaded is then requested in step B8, such as which particular week of data relating to product article performance. The data is then selected based upon the data request in step B10 and the data is then down loaded from the central communications controller 6 to the off site computer in step B12. Any standard data down load process may be utilized to perform the above functions. For the present application it was determined to be preferable to use Cimware which is manufactured by Cim PC to perform the down loading of the data.

If it is determined in step B4 that the product evaluation process is to be utilized, the product evaluation process is then implemented in step B14 discussed in detail below in connection with FIG. 7.

Figure 7:
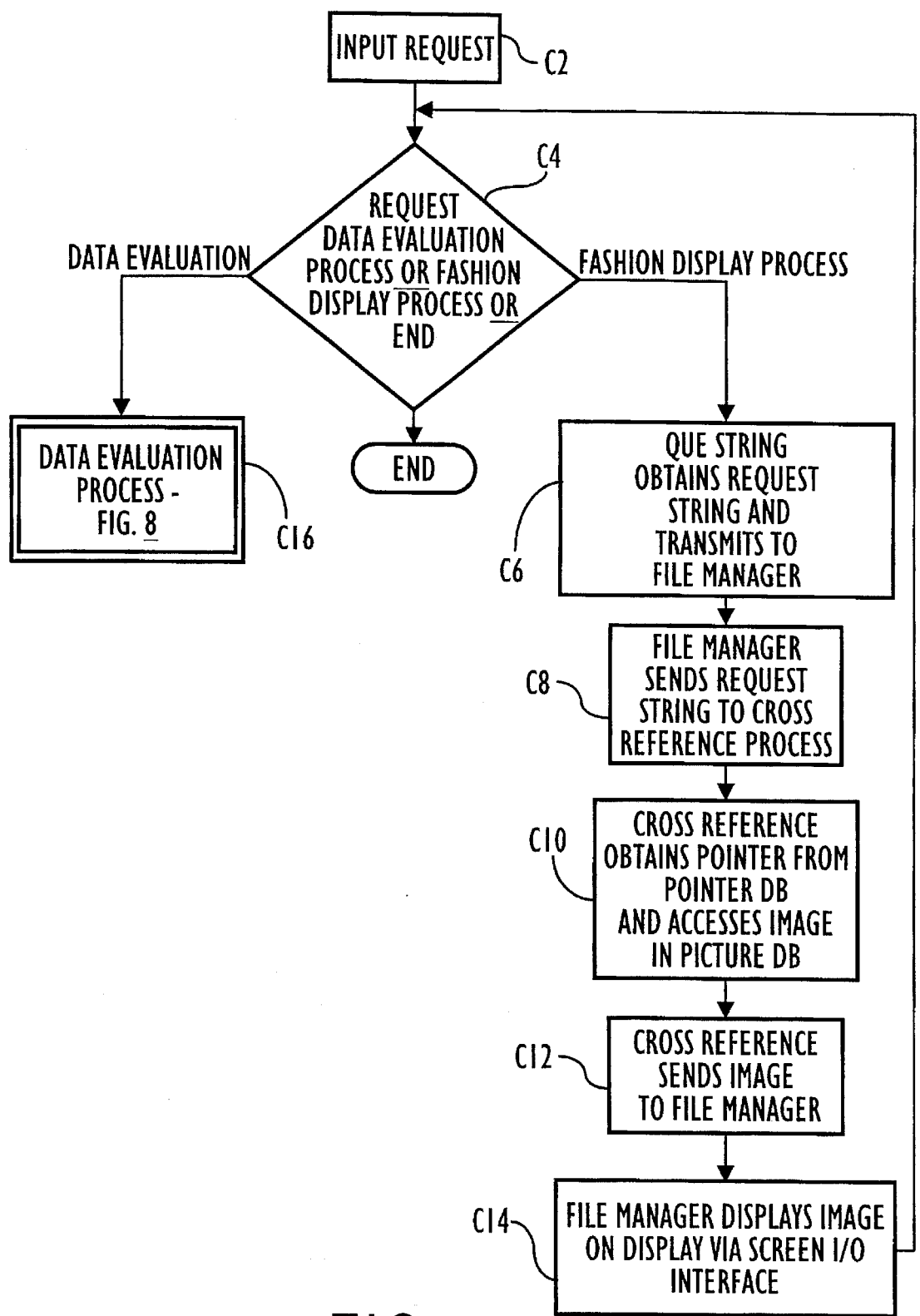
FIG. 7 is a flow chart of the product evaluation process and product display process of the present invention.

FIG. 7 is a flow chart of the product evaluation process and product display process of the present invention. As shown in FIG. 7, the user request is input to the product evaluation system at step C2. If the user request is determined to be a request for displaying a particular style of a product article in step C4, queue string 42 receives the request and generates or formats the request for transmission to file manager 44 in step C6. File manager 44 then transmits the formatted request to cross reference process 58 in step C8. Cross reference process 58 then obtains a pointer from pointer data base 60, responsive to the received formatted request, and accesses the image data or picture data base 62 responsive to the pointer in step C10. Cross reference process 58 then transmits the image data to file manager 44 in step C12. File manager 44 then displays the image data on display 56 via screen I/O interface 54 in step C14. Control of the product display process is then returned to step C4 for determining the next request from the user. If the user requests to perform an evaluation of product articles, the product evaluation process is then implemented in step C16, which is described in greater detail below in connection with FIGS. 9–10.

FIG. 8a is a diagram of the relationship between the vendor style and file name containing image data as stored in cross reference pointer data base 60. In addition, FIG. 8b is a diagram indicating the relationship between the file name and picture data stored in picture data base 62. Of course, other standard storage techniques/pointers may be utilized.

Figure 9:
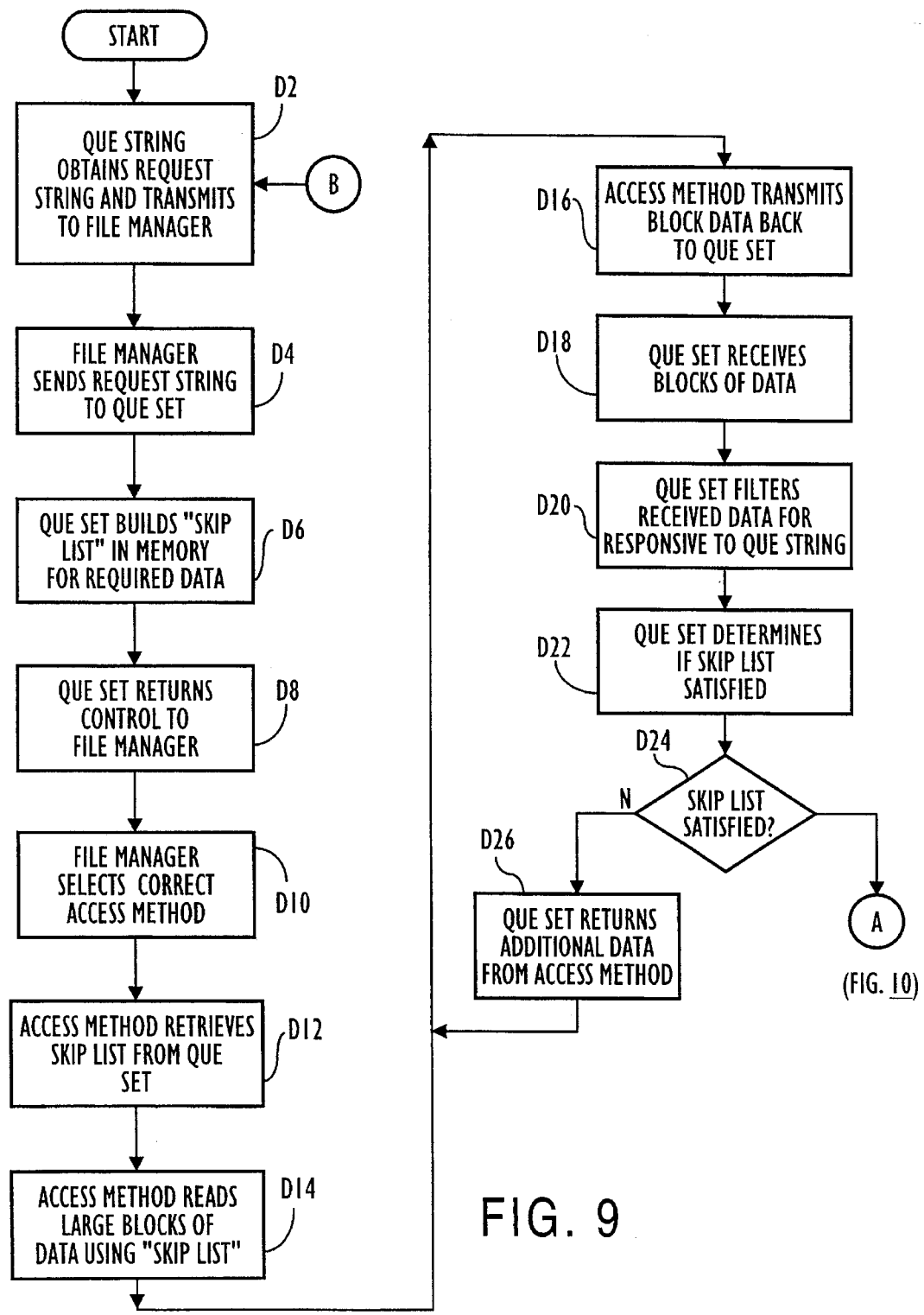
FIGS. 9–10 are flow charts of the detailed product evaluation process of the present invention.
Figure 10:
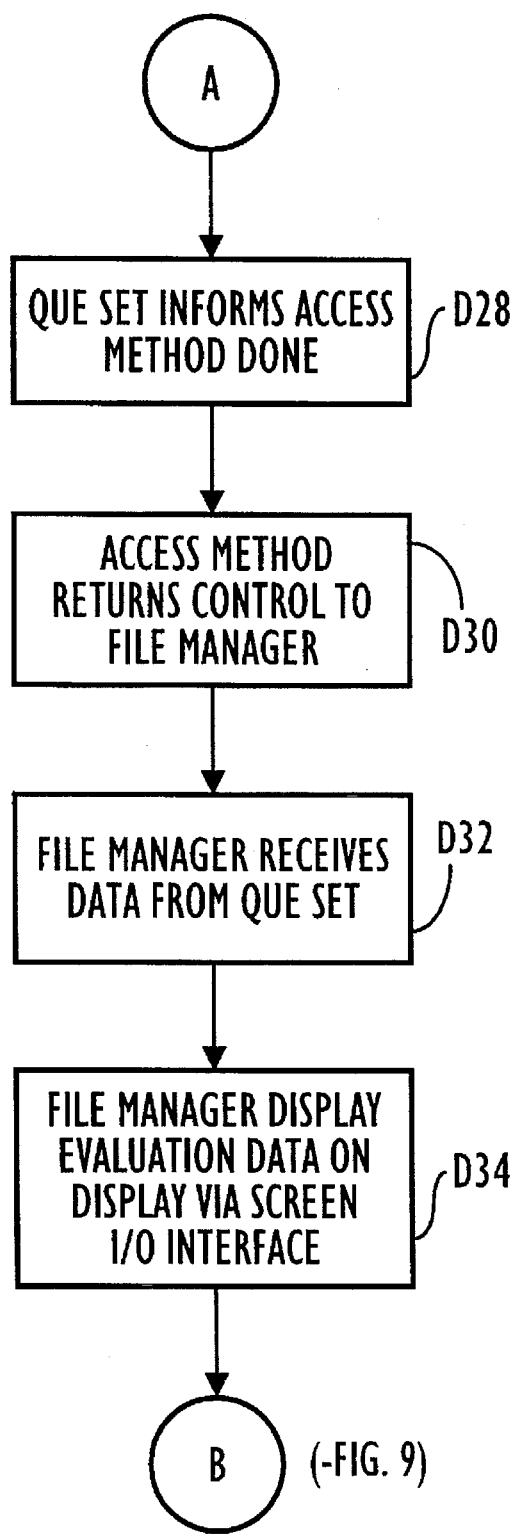

FIGS. 9–10 are flow charts of the detailed product evaluation process of the present invention. In FIGS. 9–10, queue string 42 obtains the request for performing the product evaluation from input device 32 and transmits the request to file manager 44 in step D2. As indicated previously, queue string formats the request in the form of a string which will be described in greater detail below for use by file manager 44. File manager 44 sends the request string to queue set 46 in step D4. queue set 46 then builds a skip list in memory 48 for the required or requested data in step D6. The skip list is built using prior art techniques as discussed, for example, by Bruce Schneier, "Skip Lists", Dr. Dobbs Journal, Volume 19, page 50 (January 1994), incorporated herein by reference.

In short, as discussed in Schneier, a skip list is a dynamic data structure which yields high-efficiency data access and modification characteristics while providing relative ease of implementation. Skip lists originate from the well known "linked list" data structure, but employ a probabilistic approach in assigning memory pointers to achieve extremely fast data searching, deletion, and insertion. It is instructive here to consider the way in which a skip list is derived from a simple linked list. The most basic linked list comprises a string of memory nodes, each node pointing to the node immediately following. Such a structure is extremely easy to implement, but tends to be very slow because one must search methodically through every entry in the list to find a particular node. The searching process can be cut in half if every other node not only has a pointer to the node immediately following, but also a second pointer to the node two ahead. Further increases in speed may be achieved if every fourth node has a third pointer to the node four ahead, every eighth node has a fourth pointer to the node eight ahead, and so on. However, the overhead associated with such an approach is highly problematic; every time data is added to or deleted from the list, every pointer at every node must be updated. Skip lists circumvent this difficulty without significantly diminishing the speed advantage by probabilistically assigning pointers. For example, the number of pointers for each node may be generated randomly according to a probability density function such that, on average, each node will have only 1.33 pointers. In such case, the speed of data searching will match that of the multi-pointer structure described above, but the overhead associated with data addition and deletion will be only 1.33 times that of a simple linked list.

Queue set 46 next returns control of the product evaluation process to file manager 44 in step D8. Based upon the request string received from queue string 42, file manager 44 determines the appropriate access method from the eight data gathering modules 50 in step D10. While any data access method is satisfactory for retrieving data from main data base 52, the product evaluation system of the present invention preferably utilizes eight dedicated modules 50 which are essentially preformatted requests to main data base 52 to more efficiently retrieve data from main data base 52. Each of these eight data gathering modules 50 is discussed in detail below.

After selecting the correct access method in step D10, the selected access method retrieves the skip list from queue set 46 in step D12, and in response to the skip list received from queue set 46, the selected access method reads large blocks of data into random access memory from main data base 52 in step D14. The selected access method then transmits the block data back to queue set 46 in step D16, and queue set 46 receives the blocks of data in Step D18. Queue set 46 then filters the received data from the selected access method, responsive to the queue string which was originally received from file manager 44 and built by queue string 42 in step D20. queue set 46 next determines if the skip list is satisfied in step D22. If the skip list is not satisfied in step D24, queue set 46 requests additional data from the selected access method in step D26 and the access method then transmits the data back to queue set 46 as described previously.

If the skip list is determined to be satisfied in step D24, queue set 46 informs the selected access method that it has received all the required data in step D28. Next, the selected access method returns control of the product evaluation process to file manager 44 in step D30. File manager 44 then receives the appropriate data from queue set 46 in step D32, after queue set has filtered the data as described previously. File manager 44 then transmits the evaluation data for display on display 56 via screen I/O interface 54 in step D34. Once the data is displayed on display 56, the user has the option to prioritize the data as will be described in greater detail below. After the evaluation data is displayed in step D34, control of the product evaluation process is then returned to step D2 to process subsequent evaluation requests received via input device 32.

FIG. 11 is a diagram indicating the relationship between the queue string and skip list in accordance with the principals of the present invention. As shown in FIG. 11, the queue string includes designations specifying the hierarchy and level of data which is to be compared in the product evaluation process. For example, a first queue string which may be generated may request a comparison between the vendors with respect to selling location or groups which is shown at 70. The user may then request a more detailed evaluation by requesting a comparison with respect to the different vendor styles for a specific vendor with respect to a specific group. This type of request is then input via the input device 32 and is shown in FIG. 11 at 72. This request is received by queue string 42 and transmitted to file manager 44 which thereupon transmits the more detailed request to queue set 46. queue set 46 then builds the skip list which essentially adds or concatenates onto the previous skip list the additional, more detailed request which is shown at 74. This new skip list is then used for retrieving the large blocks of data from the main data base into RAM so that it is readily available for presentation to the user.

Advantageously, by placing large blocks of data via the skip list in RAM, in particular up to 1000 records which satisfy the query string or skip list, the product evaluation system of the present invention is able to more efficiently operate since the data which is to be presented for viewing by the user is preloaded in RAM, and therefore, easily and more quickly accessible.

FIG. 12a is a diagram indicating the relationship between the different data access methods and how the corresponding data grouping files are inventoried in the main data base in accordance with the principles of the present invention. As shown in FIG. 12a, for example, the access method TOTK0 shown at 76 is specifically designed to access data which is grouped with respect to total or high level product evaluation requests. Thus, general requests relating to overall group performance or overall vendor performance are grouped together in this data grouping file. In particular, TOTK0 accesses the total file shown at 78 which contains total records at various levels and returns these records that fulfill the skip list which was passed to TOTK0 from queue set 46.

Access method CCBK0 accesses the category/class file which contains records at the category/class level and returns records which satisfy the skip list which was passed to CCBK0 from queue set 46. The skip list contains different types of criteria such as the user might request simply category, category/class or category/class/level type data that the user was requesting, where level refers either the branch, group or vendor level, depending on the user request.

Access method CCBK1 accesses the category/class file which contains records at the category/class level via standard indexing techniques, and returns a set of records that satisfy the skip list that was passed to CCBK1 from queue set 46. The records generally consist of the specific branch, group or vendor level with respect to the category/class data that the user was requesting.

Access method CSBK0 accesses the category/style file which contains records at the category/style level and returns a set of records including category/style data that satisfy the skip list which was passed from queue set 46 to CSBK0. The criteria or skip list which CSBK0 uses for retrieving data relates to the specific category, category/style or category/style/level that the user was requesting, where level refers to the branch, group or vendor level.

Access method CSBK1 accesses the category/style file which contains records at the category/style level via a standard index, and returns a set of records that satisfies the skip list criteria that was passed to CSBK1 from queue set 46. The skip list may consist of the specific branch, group or vendor level with respect to the category/style that the user was requesting.

Access method VCBK0 accesses the vendor/category file which contains records at the vendor/category level and returns a set of records that satisfy the skip list that was passed from queue set 46 to VCBK0. The skip list criteria includes the specific vendor, vendor/category or vendor/category/level that the user was requesting, where level refers to the branch, group or vendor level.

Access method VCBK1 accesses the vendor/category file which contains records at the vendor/category level via a standard index, and returns a set of records that satisfy the skip list criteria that were passed from queue set 46 to VCBK1. This skip list criteria would consist of the specific branch, group or vendor level that was requested by the user.

Finally, access method VCBK2 accesses the vendor/category file which contains records at the vendor/category level using a standard index with respect to vendor style, and returns a set of records that satisfy the skip list criteria that was passed to VCBK2 via queue set 46. This skip list criteria would consist of the specific vendor style that the user was requesting.

While the present invention utilizes these specific access methods 50, it should be noted that any standard access method for accessing data from a data base may be utilized for retrieving the data to perform the data comparison. However, the specific access methods which are utilized in the present invention are organized with respect to particular categories, levels and styles which facilitates the retrieval and transmission of this data for display to the user.

FIG. 12b illustrates the data structure of the particular product article, where as indicated previously, the class of the product article represents a high level grouping such as diamond jewelry, the category level represents a lower level grouping such a diamond watches, and the style level represents the lowest level of grouping, such as diamond watches of 1 carat or less. The data structure is preferably stored in main data base 52. This data structure facilitates data retrieval from main data base 52 by data gathering modules 50.

FIG. 12c is a diagram illustrating the data structure of the various entities which may be evaluated for the product evaluation system of the present invention. In FIG. 12c, the overall company or corporate structure interacts with independent vendors and groups. The vendors are the suppliers of the particular product articles where the groups are main distribution centers for the product articles. Each of the groups has its own collection of branch units which coordinate the actual buying and selling of the product articles. The data structure is preferably stored in main data base 52. This data structure facilitates data retrieval from the main data base 52 by data gathering modules 50.

Figure 13:
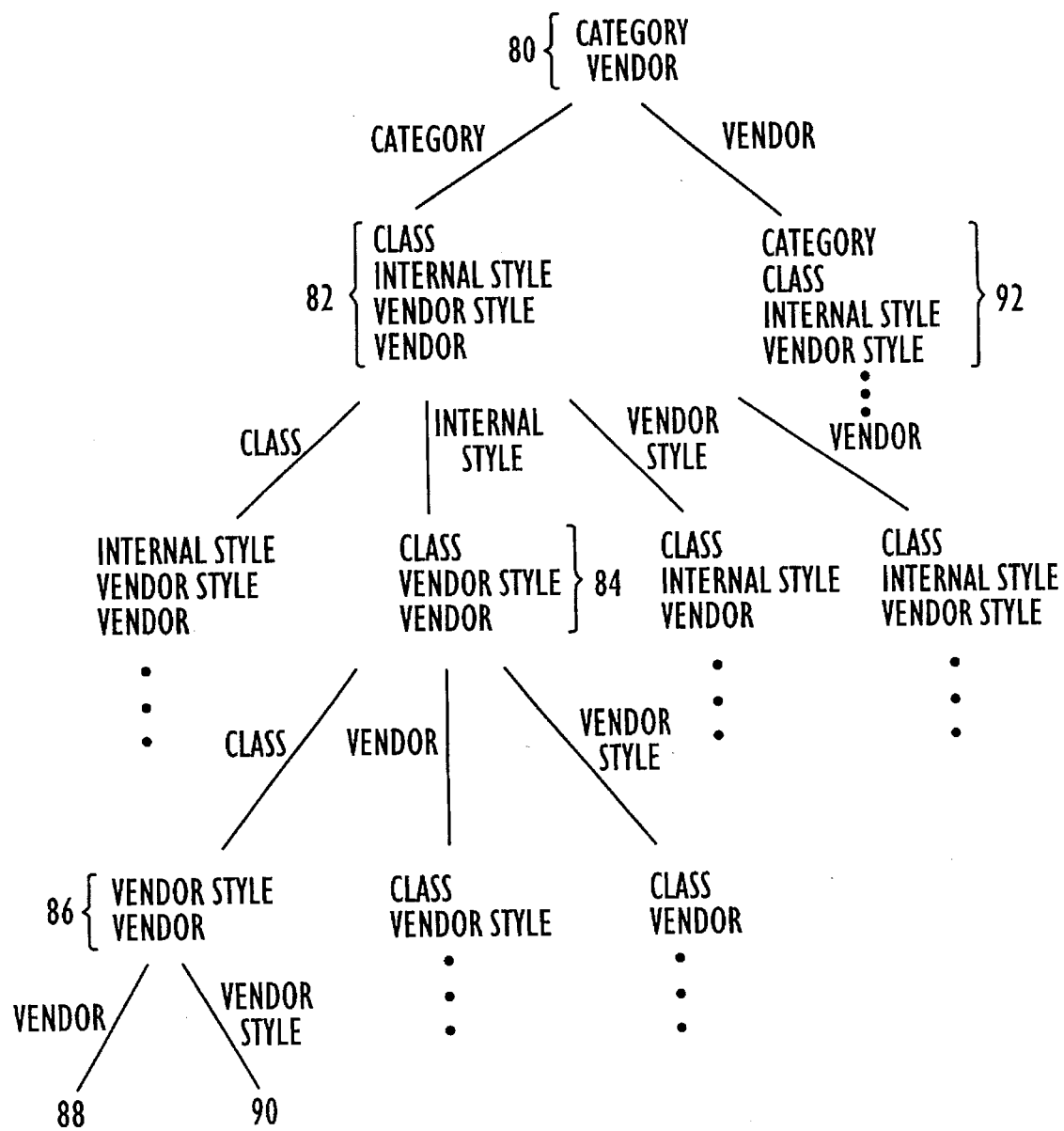
FIG. 13 is a tree structure of the interface mechanism of the present invention.

FIG. 13 is a tree structure of the interface mechanism of the present invention which is presented on the display for interfacing with the user. As shown in FIG. 13, the top of the tree structure for the interface system of the present invention involves the category or vendor level 80. The category level represents different categories of product articles for both the group and corporate level, depending on what data has been downloaded as discussed previously. Advantageously, the user then decides whether they wish to receive data regarding a performance of specific categories of product articles or whether the user would like to evaluate vendor performance. The interface mechanism is provided via screen I/O interface 54.

If the user chooses to evaluate category performance, the user then has the further option of evaluating at 82 a specific class, internal company style, vendor style or vendor performance.

If the user chooses to further evaluate the product article with respect to internal style, the user then has another option of analyzing, in greater detail, the product article performance for the selected category and internal style by further selecting one of class, vendor style or vendor at 84. If the user chooses to further evaluate the product article with respect to the class of the product article, i.e., the user has decided to evaluate a particular class of product article with respect to the chosen internal style and chosen category, the user may further evaluate the chosen class by selecting one of the vendor style or vendor at 86, resulting in the final and most detailed analysis of a specific vendor at 88 and of the specific vendor style at 90.

If the user decides to evaluate product articles with respect to vendor, the user then has the further options at 92 of further evaluating vendor performance with respect to category, class, internal style or vendor style. The above tree structure was a sample of the overall tree structures which are utilized in product evaluation system of the present invention. As illustrated, the user has the ability to interactively and efficiently create their own evaluation system depending on what type of comparison they would like to make.

FIG. 14 is a diagram generated by the product evaluation system of the present invention which illustrates hot groups, where each group comprises several selling branches, as prioritized in accordance with the season to date (STD) costs illustrated at 94. As shown in FIG. 14, the on-hand cost 96 represents total cost of inventory for all units with respect to the particular listed groups. As previously indicated, the season to date cost at 94 represents the total cost of the items in inventory for the current season. At 98, last year (LY) season to date cost of the inventory is displayed, and at 100 the percentage of total cost of units on hand (OH) is displayed with respect to all units on hand for all groups. That is, the percentage of total cost on hand is defined as the individual on hand cost designated by A divided by the total on hand cost which is designated by B in FIG. 14.

The percentage of total cost season to date is then illustrated at 102. This will then be the individual season to date cost for each group designated by letter C divided by the total season to date cost which is designated by letter D. At 104, the percentage of sell through cost is computed. This is essentially the season to date cost designated at C divided by the sum of the on hand cost designated at A with the season to date cost designated at C. At 106, the average cost on hand is presented which is equal to the on hand cost designated at letter A divided by the on hand units which is not illustrated on this screen. Finally, at 108, the average cost season to date is calculated which is defined as the season to date cost designated by C divided by the season to date units which is also not shown in this figure but which is maintained by the product and evaluation system for this calculation.

Note that as shown at 110, this data illustrated in FIG. 14 represents the cost with respect to the particular groups. However, this data can be easily converted into the retail selling prices for all these values by simply, for example, pressing function F3, and the product evaluation system automatically computes a similar table of information with respect to the retail value of the product articles. The retail information would be determined in a similar manner as previously described in connection with the cost data illustrated in FIG. 14.

FIG. 15 is a diagram generated by the product evaluation system of the present invention illustrating season to date units for the hot groups prioritized in FIG. 14 for viewing by corporate personnel. As shown in FIG. 15, various data are displayed with respect to units which are on hand or sold. In particular, column 112 represents the on hand units for each of the groups, and column 114 represents the season to date units which are inventoried for each of the groups. In addition, at 116 is illustrated last year season to date units, and at 118 is illustrated the percentage of total units on hand. The percentage of total units on hand is calculated in a similar manner with respect to the percentage of total costs on hand which is the on hand units designated by the letter E divided by the total on hand units designated by the letter F.

At 120, the percentage of total units season to date is displayed, and at 122, the percentage of sell through units is displayed. The percentage of total units season to date is the season to date units designated by the letter G divided by the total season to date units designated by the letter H. Similarly, the percentage of sell through units is defined as the season to date units for a particular grouping designated by the letter G divided by the sum of on hand units designated by the letter E and the season to date units designated by the letter G. At 124 is calculated last year's gross margin percentage which is the difference between the season to date retail subtracted from the season to date cost divided by the season to date retail on a unit basis with respect to last year's performance.

At 126, the gross margin percentage for the current year is calculated in a similar manner as last year gross margin percentage using this year's data. Note that the prioritization in FIG. 15 is with respect to season to date cost shown in FIG. 14 at 94. Thus, the user is still able to maintain the same prioritization scheme to compare, in this situation, a group's performance with respect to cost and unit data. This is the type of high level data which corporate personnel are most intimately familiar with, and concerned with.

FIG. 16 is a diagram generated by the product evaluation system of the present invention illustrating the hot classes of product articles with respect to a particular group and category prioritized by units on hand. The data which is presented to the user advantageously allows the user to identify what level of comparison is being performed by including the level indicator shown at 128.

The remaining figures, FIGS. 17–24, represent similar data with respect to different user specified comparisons, and may be easily understood by inspection, particularly be referencing the tree structure of FIG. 13, and will not be discussed in detail.

Finally, it should be noted that while the above process was described with reference to the various flow charts of the present application, in essence, the various steps of the present invention were implemented by hardware computer components. Accordingly, each step of the present invention typically generates an electrical signal which represents a result of the specific step in the illustrated flow charts. Accordingly, the flow charts represent the electrical signals which are generated and used in subsequent steps of the process of the product evaluation system of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction illustrated and described, and accordingly, all suitable modifications and equivalence may be resorted to, falling within the scope of the invention.

I claim:

1. A computer architecture for an evaluation system evaluating a comparative level of success of an article according to predetermined criteria, comprising:

request retrieving means for receiving an evaluation request to evaluate the comparative level of success of the article, and for generating a formatted evaluation request;

control means for receiving the formatted evaluation request from said request retrieving means, for transmitting the formatted request, and for processing requested evaluation data to generate an evaluation result indicating the comparative level of success of the article with respect to the following: category of the article, class of the article, style of the article, group selling location of the article, branch selling location of the article, and vendor distributor of the article in comparison with the following: retail sale of the article, cost of the article and unit number characteristics of the article;

a skip list data base storing skip lists;

request generating means for receiving the formatted request from said control means, for generating a skip list responsive to the formatted request and the skip lists stored in said skip list data base, and for notifying said control means that the skip list has been generated;

a main data base storing evaluation data representing the predetermined criteria used to evaluate the comparative level of success of the article, said evaluation data being stored hierarchically with respect to the following: the category of the article, the class of the article, the style of the article, the group selling location of the article, the branch selling location of the article, and the vendor distributor of the article; and data gathering means for receiving a retrieve request generated by said control means, for obtaining the skip list from said request generating means, and for retrieving the requested evaluation data from the evaluation data stored in said main data base responsive to the skip list for evaluating the comparative level of success of the article.

2. A computer architecture as recited in claim 1, further comprising:

a picture data base storing picture data of articles to be evaluated; and picture access means for receiving a picture request from said control means, and for retrieving the picture data for display of a picture of the article being evaluated.

3. A computer architecture as recited in claim 1, wherein the success of the article is determined responsive to the following: retail, cost and unit number characteristics of the article marketed by a selling location.

4. A computer architecture as recited in claim 3, wherein cost success of the article is determined responsive to at least one of the following: on hand (OH) cost, season to date (STD) cost, last year STD cost, percentage of total cost of units OH, percentage of total cost STD, percentage of sell through cost, average cost OH, average cost STD, wherein retail success of the article is determined responsive to at least one of the following: OH retail, STD retail, last year STD retail, percentage of total retail of units OH, percentage of total retail STD, percentage of sell through retail, average retail OH, average retail STD, and wherein unit success of the article is determined responsive to at least one of the following: OH units, STD units, last year STD units, percentage of total units of units OH, percentage of total units STD, percentage of sell through units, LY gross margin percentage, and gross margin percentage.

5. A computer architecture as recited in claim 1, wherein the skip list is used by said data gathering means to store blocks of the requested evaluation data in RAM for efficient access by said control means.

6. A computer implemented product evaluation system, comprising:

a data base storing evaluation data of products, said evaluation data being stored hierarchically with respect to the following: category of the products, class of the products, style of the products, group selling location of the products, branch selling location of the products, and vendor distributor of the products;

a data processor responsively connected to said data base, receiving a request to evaluate a comparative level of success of one of the products, evaluating the comparative level of success of the one of the products, and generating an evaluation result, the evaluation result indicating the comparative level of success of the product with respect to the following: the category of the product, the class of the product, the style of the product, the group selling location of the product, the branch selling location of the product, and the vendor distributor of the product in comparison with the following: retail sale of the product, cost of the product and unit number characteristics of the product; and a display device connected to said data processor, receiving the evaluation result from said data processor, and displaying the evaluation result for the one of the articles evaluated.

7. A computer implemented product evaluation system as recited in claim 6, wherein the branch selling location inventories a quantity of the one of the products, and wherein the one of the products is re-stocked in the branch selling location responsive to the evaluation result.

8. A computer implemented product evaluation system as recited in claim 6, wherein the branch selling location comprises first and second branch locations, wherein the evaluation result indicates that the one of the products performs proportionally better in the first branch location versus the second branch location, wherein the evaluation result indicates that the one of the products performs better in the second branch location versus the first branch location with respect to number of units, and wherein the one of the products is preferentially re-stocked in the second branch location versus the first branch location.

9. A computer implemented product evaluation system as recited in claim 6, wherein the branch selling location inventories a quantity of the one of the products, wherein responsive to the evaluation result, the category belonging to the one of the products is evaluated, and wherein the one of the products is re-stocked in the branch selling location responsive to the evaluated category.

10. A computer implemented product evaluation system as recited in claim 6, wherein responsive to the evaluation result, a new product is designed with a new design similar to a design of the one of the products evaluated.

11. A computer implemented product evaluation system as recited in claim 6, wherein a vendor business relationship is terminated responsive to the evaluation result indicating poor vendor performance.

12. A computer implemented product evaluation system as recited in claim 6, wherein a prize is awarded to the branch selling location responsive to the evaluation result indicating superior branch performance.

13. A computer implemented product evaluation system as recited in claim 6, wherein the class of the product includes a broad span of the products, the category of the product includes a specific set of products within the class, and the style of the product includes a particular design of the product within a specific category.

14. A computer implemented product evaluation system as recited in claim 6, wherein the group selling location of the product includes and supervises at least two branch selling locations, the branch selling location of the product distributes the product to end users, and the vendor distributor of the product distributes the product to at least one of the group selling location and the branch selling location.

15. A computer implemented product evaluation system as recited in claim 6, wherein said data processor evaluates the comparative level of success of the one of the products, and generates the evaluation result, the evaluation result including a first display of the most successful products with respect to the retail sale of the product, the cost of the product and the unit number characteristics of the product, and the evaluation result further including a second display of the least successful products with respect to the retail sale of the product, the cost of the product and the unit number characteristics of the product.

16. A computer implemented product evaluation system as recited in claim 6, wherein the class of the product includes a broad span of the products, the category of the product includes a specific set of products within the class, and the style of the product includes a particular design of the product within a specific category, wherein the group selling location of the product includes and supervises at least two branch selling locations, the branch selling location of the product distributes the product to end users, and the vendor distributor of the product distributes the product to at least one of the group selling location and the branch selling location, and wherein said data processor evaluates the comparative level of success of the one of the products, and generates the evaluation result, the evaluation result including a first display of the most successful products with respect to the retail sale of the product, the cost of the product and the unit number characteristics of the product, and the evaluation result further including a second display of the least successful products with respect to the retail sale of the product, the cost of the product and the unit number characteristics of the product.

17. A computer implemented method of evaluating products, comprising the steps of:

(a) hierarchically storing evaluation data of the products with respect to the following: category of the products, class of the products, style of the products, group selling location of the products, branch selling location of the products, and vendor distributor of the products;

(b) receiving a request to evaluate a comparative level of success of one of the products;

(c) evaluating the comparative level of success of the one of the products;

(d) generating an evaluation result indicating the comparative level of success of the product with respect to the following: the category of the product, the class of the product, the style of the product, the group selling location of the product, the branch selling location of the product, and the vendor distributor of the product in comparison with the following: retail sale of the product, cost of the product and unit number characteristics of the product; and (e) displaying the evaluation result for the one of the products evaluated.

18. An interactive computer implemented method for evaluating a comparative level of success of a product, interactively with a user, comprising the steps of:

(a) requesting the user to select one of category and vendor for evaluating the product;

(b) responsive to the user selecting the category in said requesting step (a), performing the following steps:

(b1) displaying first evaluation data relating to the performance of the product with respect to the category;

(b2) prioritizing the first evaluation data responsive to user selection with respect to at least one of product retail price, product cost, and product units;

(b3) requesting the user to select at least one of class, internal style, vendor style, and vendor for further evaluating the product with respect to category;

(b4) displaying second evaluation data relating to the performance of the product with respect to the at least one of class, internal style, vendor style, and vendor and with respect to the category;

(b5) prioritizing the second evaluation data responsive to user selection with respect to at least one of product retail price, product cost, and product units;

(c) responsive to the user selecting the vendor in said requesting step (a), performing the following steps:

(c1) displaying third evaluation data relating to the performance of the product with respect to the vendor;

(c2) prioritizing the third evaluation data responsive to user selection with respect to at least one of product retail price, product cost, and product units;

(c3) requesting the user to select at least one of class, internal style, vendor style, and category for further evaluating the product with respect to vendor;

(c4) displaying fourth evaluation data relating to the performance of the product with respect to the at least one of class, internal style, vendor style, and category and with respect to the vendor;

(c5) prioritizing the fourth evaluation data responsive to user selection with respect to at least one of product retail price, product cost, and product units.

19. A memory storing data for access by a product evaluation application program being executed on a data processing system, the product evaluation application program evaluating a comparative level of success of products, comprising:

a first data structure stored in said memory, said first data structure including first information resident in a database used by said application program and including:

class specific data objects indicating a first broadest classification of the products with respect to design;

category specific data objects indicating a second classification of the products, wherein a plurality of categories correspond to a class, establishing a first hierarchy between the category and class specific data objects; and style specific data objects indicating a third classification of the products, wherein a plurality of styles correspond to a category, establishing a second hierarchy between the category and style specific data objects;

a second data structure stored in said memory, said second data structure including second information resident in the database used by said application program and including:

company specific data objects indicating a fourth broadest classification of the products with respect to entity;

vendor and group specific data objects indicating a fifth classification of the products, wherein a plurality of vendors and groups correspond to a company, establishing a third hierarchy between the company and the vendor and group specific data objects;

branch specific data objects indicating a sixth classification of the products, wherein a plurality of branches correspond to a group, establishing a fourth hierarchy between the vendor and group specific data objects and the branch specific data objects, wherein said data processing system executes the product evaluation application program evaluating a comparative level of success of products by accessing said memory storing the data including the first and second data structures, and generating an evaluation result.

20. A memory for storing data as recited in claim 19, wherein the first and second data structures are compared to one another for evaluating a comparative level of success of products.

21. A method of reusing a product evaluation application program on different work stations by accessing different data to provide different evaluations responsive to the different data, indicating a comparative level of success of products, comprising the steps of:

(a) storing the product evaluation application program on group and vendor computers;

(b) downloading group specific data to the group computer and vendor specific data to the vendor computer, said group specific and vendor specific data including the following: category of the products, class of the products, style of the products, group selling location of the products, branch selling location of the products, and vendor distributor of the products;

(c) executing the product evaluation application program at the group computer using the group specific data to evaluate the products with respect to group performance indicating the comparative level of success of the product with respect to the following: the category of the product, the class of the product, the style of the product, the group selling location of the product, the branch selling location of the product, and the vendor distributor of the product in comparison with the following: retail sale of the product, cost of the product and unit number characteristics of the product; and (d) executing the product evaluation application program at the vendor computer using the vendor specific data to evaluate the products with respect to vendor performance indicating the comparative level of success of the product with respect to the following: the category of the product, the class of the product, the style of the product, the group selling location of the product, the branch selling location of the product, and the vendor distributor of the product in comparison with the following: retail sale of the product, cost of the product and unit number characteristics of the product.

22. A method of reusing a product evaluation application program as recited in claim 21, wherein said storing step (a) further comprises the step of storing the application program on a corporate computer, wherein said downloading step (b) further comprises the step of downloading corporate specific data to the corporate computer, and wherein said method of reusing the product evaluation application program further comprises the step of executing the product evaluation application program at the corporate computer using the corporate specific data to evaluate the products with respect to corporate performance.

* * * * *